(12) United States Patent
Shen

(10) Patent No.: US 7,405,829 B2
(45) Date of Patent: Jul. 29, 2008

(54) APPARATUS AND METHOD FOR CHARACTERIZING PULSED OPTICAL SIGNALS

(75) Inventor: Jinxi Shen, San Ramon, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 339 days.

(21) Appl. No.: 11/290,072

(22) Filed: Nov. 30, 2005

(65) Prior Publication Data

US 2006/0285117 A1 Dec. 21, 2006

Related U.S. Application Data

(60) Provisional application No. 60/691,443, filed on Jun. 17, 2005.

(51) Int. Cl.
*G01B 9/02* (2006.01)

(52) U.S. Cl. ...................................... 356/450

(58) Field of Classification Search ................... 356/450
See application file for complete search history.

(56) References Cited

U.S. PATENT DOCUMENTS

| | | | |
|---|---|---|---|
| 4,097,697 | A | 6/1978 | Harman |
| 4,823,360 | A | 4/1989 | Tremblay |
| 5,524,144 | A | 6/1996 | Suzuki |
| 5,880,837 | A * | 3/1999 | Roberts ...................... 356/450 |
| 2004/0227949 | A1 * | 11/2004 | Dorrer et al. ................ 356/450 |
| 2007/0122161 | A1 * | 5/2007 | Charlet et al. ............... 398/188 |

OTHER PUBLICATIONS

Takara et al, "Eye-Diagram Measurement of 100 Gbits/sec Optical Signal Using Optical Sampling", 22$^{nd}$ European Conf. On Optical Comm-ECOC 1996 Oslo, pp. 7-10.
Idler et al, "10 Gb/s Wavelength Conversion with Integrated Multiquantum-Well Based 3-Port Mach-Zehnder Interferometer", IEEE Photonics Technology Letters, vol. 8, No. 9, Sep. 1996, pp. 1163-1165.

* cited by examiner

*Primary Examiner*—Patrick J Connolly
(74) *Attorney, Agent, or Firm*—Allen, Dyer, Doppelt, Milbrath & Gilchrist, P.A.

(57) ABSTRACT

The coherent interference effect between two beam is used with one light beam delayed by a controllably variable time delay with respect to another analogous beam to obtain a convolutional profile of the oscillatory component of the interference amplitude as a function of the time delay, having a peak value representing the performance clearance between a zero-bit and a one-bit. The convolutional profile is represented by a diamond diagram (DD) of the interference amplitude, within the coherence length. The peak value and the size of DD openings are used for characterizing pulsed optical signals by determining at least one of a predefined set of signal parameters, including signal degradation, optical chromatic dispersion, signal coherence length, type of signal modulation, and signal-to-noise ratio. The two-beam interference effect is optionally provided by a free-space Mach Zehnder interferometer, an integrated Mach Zehnder interferometer, a Michelson interferometer, or combinations thereof.

27 Claims, 23 Drawing Sheets

APPARATUS AND METHOD FOR CHARACTERIZING PULSED OPTICAL SIGNALS

CROSS-REFERENCE TO RELATED APPLICATIONS

The present invention claims priority from U.S. Provisional Patent Application No. 60/691,443 filed Jun. 17, 2005, and entitled "Optical Detection on Communication Eye Diagram Using Coherent Interference Effect", which is incorporated herein by reference.

FIELD OF THE INVENTION

This invention generally relates to systems and methods for characterizing communication signals in general, and of high-speed pulsed optical signals in particular.

BACKGROUND TO THE INVENTION

In newer digital optical communication systems operating at higher speeds of bit rates at 10 Gbits/sec or more, monitoring the signal quality deterioration becomes more problematic with increasing bit rates. Conventional methods involving the electronic measurement and subsequent processing of the optical signal eye diagram will be limited by the inherent difficulties in performing electronic processing at very high bit rates, rendering such methods to be prohibitively expensive for bit rates in excess of about 10 Gbits/sec.

Examples of typical eye diagram measuring techniques, which involve regenerating an optical signal to monitor signal quality, are disclosed by Harman in U.S. Pat. No. 4,097,697 and by Tremblay et al in U.S. Pat. No. 4,823,360.

It is also known from H. Takara et al, "Eye-diagram measurement of 100 Gbit/s optical signals using optical sampling": 22nd European Conference on Optical Communication—ECOC 1996 Oslo, vol. 4 pages 7-10, that eye diagrams of very high-speed optical signals can be obtained by optical sampling using an organic non-linear crystal. The ability to use optical sampling before conversion to electronic signal facilitates the use of less sophisticated electronic processing: Reliance upon the organic non-linear crystal, however, has inherent disadvantages such as the difficulty of integrating this optical component in a sensor system. A further major disadvantage of this method is that sampling pulses are required to be generated at excessively high power, i.e. in excess of 200 watts.

It is further known from Idler et al, "10 Gb/s Wavelength Conversion with Integrated Multiquantum-Well-Based 3-Port Mach-Zehnder Interferometer": IEEE Photonics Technology Letters, Vol. 8, No. 9, September 1996, pages 1163-1165, that inversion of a single optical signal in addition to wavelength conversion can be provided by means of a Mach-Zehnder interferometer in which semiconductor optical amplifiers are utilised to set an interference condition between optical components of an input signal transmitted through first and second arms of the interferometer. A continuous wave optical signal propagated equally through the first and second arms is recombined to form an interference signal which is modulated according to the interference condition and a pulsed optical signal is counter-propagated through only one of the arms so as to modulate the phase of one of the component signals by cross-phase modulation due to the non-linear characteristics of the semiconductor optical amplifier in that arm.

More recently, Roberts disclosed in U.S. Pat. No. 5,880,837 a technique for monitoring signal deterioration of an optical by obtaining eye measurement data, using an interferometer for optical sampling of the optical signal. Sampling optical pulses are propagated equally through the two interferometer arms, where each arm includes semiconductor optical amplifiers. The monitored optical signal is counter-propagated through one arm of the interferometer, thereby setting an interference condition of the interferometer by cross modulation in one of the semiconductor optical amplifiers. The sampled interference signal is detected and converted to electrical signals to be processed for obtaining eye measurement data. Again the use of semiconductor devices in this disclosure may present practical limitations with optical signals at very high bit rates.

In view of the limitations in the prior art reviewed above, there still remains a clear need for simplified means for characterizing signal quality deterioration of high-speed digital optical signals having bit rates of 10 Gbits/sec or more without having to rely on the use of semiconductor devices.

SUMMARY OF THE INVENTION

An object of the present invention is to provide a simpler optical set-up based on two-beam interference effect to test the eye opening of a high speed digital communication system, especially over 10 GBit/second, without having to rely on speed-limited and costly electronic solution. The current invention is in favor of high speed, which means shorter time delay in one of the two arm of the interferometer required for interference amplitude profile measurement.

In a first aspect, the present invention there provides an apparatus for characterizing a detected optical signal in a communication system, the apparatus comprising:

at least one interferometer having an input port for receiving the detected optical signal, the input port diverging into a first arm and a second arm for splitting the detected optical signal into a first signal portion and a second signal portion between the first and second arms respectively, the second arm having delay means for subjecting the second signal portion to a controllably variable time delay relative to the first signal portion, the first and second arms converging into an output port for recombining the two signal portions to obtain an interference signal;

a processor optically coupled to the output port for using the interference signal in determining at least one of a predefined set of parameters related to the detected signal, by mapping the interference signal as a function of the variable time delay, deriving oscillatory component of said function, and obtaining amplitude profile of the oscillatory component versus the variable time delay.

In one embodiment, the at least one interferometer is a free space Mach Zehnder interferometer, and the delay means comprises an optical path having a variable optical length, and optionally a phase delay material suitable for providing fine time delay increments. The phase delay material is optionally one of electro-optical and thermal optical materials. In this embodiment, a polarization dependent second arm will permit monitoring speed variation in the communication system polarization.

Alternative options to the at least one interferometer include:

an integrated Mach Zehnder interferometer, and one half free space Mach Zehnder interferometer connected to one half integrated Mach Zehnder interferometer, with the delay means comprising a variable optical path length in the half free space Mach Zehnder interferometer for providing fine precision time delay increments, and a variable time delay element in the half integrated Mach Zehnder interferometer for providing coarse precision time delay increments.

Another alternative to the at least one interferometer is a plurality of N interferometers, each interferometer providing a time delay range different form all the other N−1 interferometers, with the apparatus further comprising distribution means for directing the detected signal into the input port of at least one of the N interferometers. The distribution means is optionally one of a 1×N switch, a star coupler, and a signal splitter.

In an alternative embodiment, the at least one interferometer is a Michelson interferometer.

According to another aspect of the present invention, there is provided a method, in a communication system, for characterizing a detected pulsed signal defining a bit duration, the method comprising the steps of:

deriving two analogous signals from the detected signal;
subjecting one of the two analogous signals to a controllably variable time delay;
recombining the two analogous signals to obtain an interference signal; and
processing the interference signal to determine at least one of a predefined set of parameters related to the detected signal, by mapping the interference signal as a function of the variable time delay, deriving oscillatory component of said function, obtaining amplitude profile of the oscillatory component versus the variable time delay, determining at least two successive values of the amplitude profile, corresponding to time delay values starting at zero with increments of at least one successive multiple of bit duration, whereby a first amplitude profile value corresponds to zero time delay, and a second amplitude profile value corresponds to a time delay of one bit duration.

The set of signal parameters to be determined includes signal coherence length, signal-to-noise ratio, and type of signal modulation.

The signal coherence length is estimated from the rate of decay in the at least two successive values of the amplitude profile.

When the detected signal is a combination of an original signal of a longer coherence length than one bit duration, and added noise of a shorter coherence length than one bit duration, the signal-to-noise ratio is estimated by using the first profile value as an indicator of the combination of the original signal and the added noise, and the second profile value as an indicator of only the original signal. For a detected signal carrying a random return-to-zero stream of bits, the signal-to-noise ratio is estimated by taking the combination of the original signal and the added noise as being proportional to the first amplitude profile value, and the original signal as being proportional to substantially twice the second amplitude profile value. The added noise is system noise, where the communication system uses a relatively wide filter window. On the other hand, the added noise is channel noise, where the communication system uses a filter meeting the ITU passband requirement.

For a pulsed random detected signal defining a bit duration, the amplitude profile is used to define a diamond diagram (DD) with at least one maximum diamond opening (MDO), and the type of signal modulation is determined as follows. The type of modulation is determined as one of return-to-zero and carrier suppressed return-to-zero, when the DD is found to have an initial MDO at zero time delay and a subsequent MDO of substantially half the initial MDO at a time delay of one bit duration.

Alternatively, the type of signal modulation is determined as non-return-to-zero when the DD is found to have a MDO at zero time delay, with the diamond opening declining to substantially half the MDO at a time delay of one bit duration and remaining constant thereafter.

Furthermore, the type of signal modulation is determined as Phase shift keying when the DD is found to have a MDO at a zero time delay, with the diamond opening declining to substantially zero at a time delay of one bit duration and remaining constant thereafter.

The present invention also allows for monitoring performance of the communication system, by comparing between the amplitude profiles respectively obtained for an upstream signal and a downstream signal in accordance with the method described above.

According to a further aspect, there is provided a method for characterizing a pulsed optical signal, comprising the steps of:

splitting the optical signal into two beams;
applying a controllably variable time delay to one of the two beams;
recombining the two beams to obtain a diamond diagram resulting from the coherent interference effect;
using a maximum opening of the optical diamond diagram to determine performance clearance between a zero-bit and a one-bit of the optical signal.

BRIEF DESCRIPTION OF THE DRAWINGS

Exemplary embodiments of the invention will now be further described with references to the attached Figures in which same reference numerals designate similar parts throughout the figures thereof, and wherein.

DETAILED DESCRIPTION

Reference herein to any embodiment means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

The present invention addresses the limitations of prior art systems by making use of the fact that the coherence length of a light beam forming original optical signal bits is much larger than the coherence length of the added optical noise. This makes it possible to separate the bit signal level from noise by using coherent interference effect.

Figure 1:
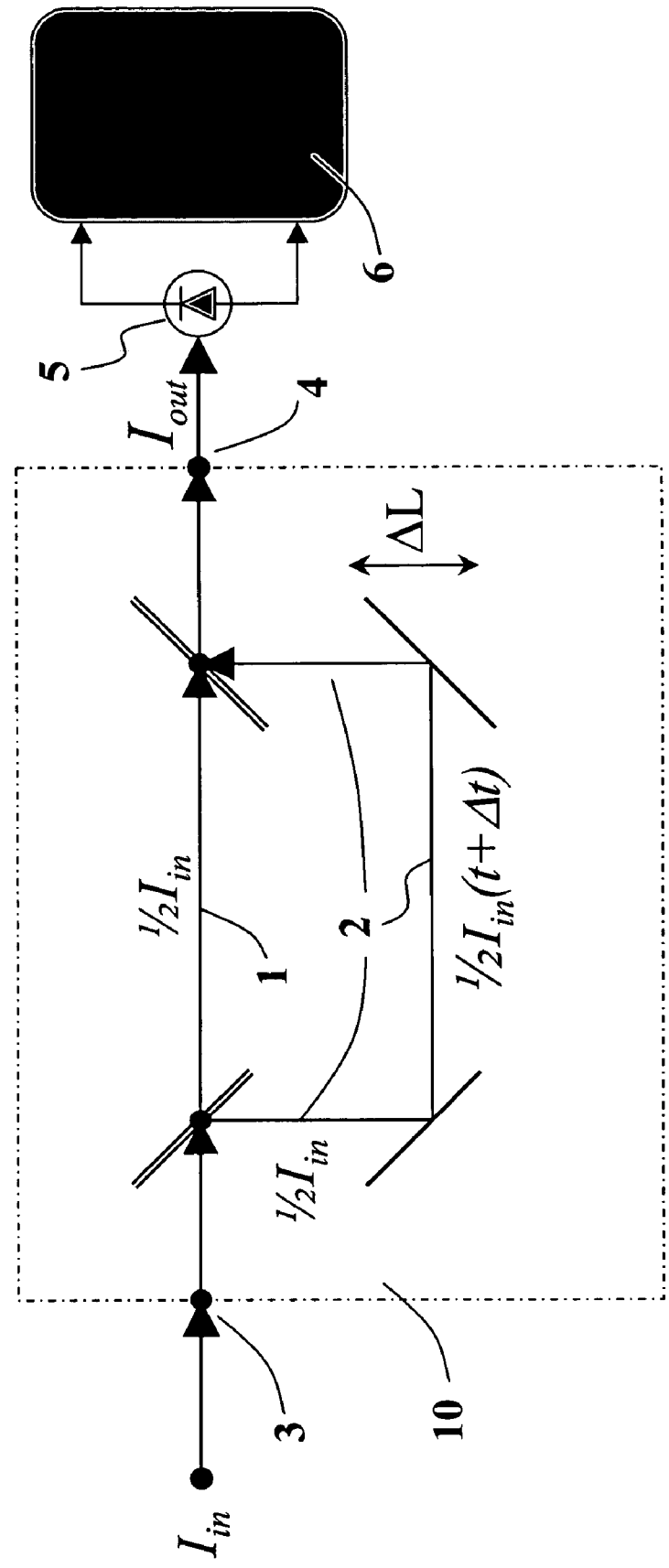
FIG. 1 illustrates the process of combining a portion of a optical detected signal, with another portion thereof delayed by a variable time delay, in accordance with an embodiment of the present invention.

FIG. 1 illustrates the process of obtaining an interference signal from combining two analogous signals derived from a detected signal in a communication system in general, and a pulsed optical signal in particular, where one of the two analogous signals is delayed relative to the other one, in accordance with an embodiment of the present invention. Here, a detected signal $I_{in}$ is divided into two equal portions; a first portion $½I_{in}(t)$ and a second portion $½I_{in}(t+\Delta t)$ subjected to a controllably variable time delay $\Delta t$ relative to the detected signal. The two portions $½I_{in}(t)$ and $½I_{in}(t+\Delta t)$ are then recombined to obtain an interference signal $I_{out}$.

When the detected signal $I_{in}$ is an optical signal, the above process is preferably implemented using a two-beam interferometer 10, as shown in FIG. 1. The interferometer 10 has an input port 3 diverging into a first arm 1 and a second arm 2. When the detected signal $I_{in}$ is received at the input port 3, this signal is split into a first signal portion and a second signal portion passing through the first arm 1 and the second arm 2 respectively. The first arm 1 has fixed length L and the second arm 2 has delay means in the form of an optical path of a variable length $L+\Delta L$, where $\Delta L$ is controllably variable, to provide the time delay $\Delta t$ relative to the first signal portion in proportion to $\Delta L$. The first arm 1 and the second arm 2 converge into an output port 4 for recombining the two signal portions $½I_{in}(t)$ and $½I_{in}(t+\Delta t)$ and obtaining an interference signal $I_{out}$ at the output port 4, which in turn is optically coupled to a processor 6 through an optical sensor 5. The processor 6 maps the amplitude of the interference signal as a function I of the variable time delay $\Delta t$, derives oscillatory component of this function, and obtains amplitude profile of the oscillatory component for use in determining at least one of a predefined set of signal parameters in accordance with the principles further described below for various embodiments of the present invention. These parameters include among others signal degradation, optical chromatic dispersion, signal coherence length, type of signal modulation, and signal-to-noise ratio.

Several options for the interferometer illustrated in FIG. 1 are available for use in embodiments of the present invention, including free space Mach Zehnder interferometer, integrated Mach Zehnder interferometer, Michelson interferometer, any combinations thereof, and any other means for introducing a delay stage for two beam self-interference.

The use of a free space Mach Zehnder interferometer for the two-beam interferometer 10 illustrated in FIG. 1 offers the advantage of providing a continuously variable time delay $\Delta t$ incremented in fine steps to resemble a continuous variable.

Alternatively, the use of an integrated Mach Zehnder interferometer offers the advantages of having a compact structure with a fast time response and no moving parts. It works for all polarization states, and the maximum attenuation location $P_0$ would not adversely impact its performance, as the polarization-dependent $P_0$(PDP) would not influence the system signal characterization if the system PDL variation rate is much lower than several hundred kHz. On the other hand, this embodiment stands to suffer from the disadvantages of not being flexible for different modulation rate, and low modulation rate system would result when using relatively big microchips.

Figure 2A:
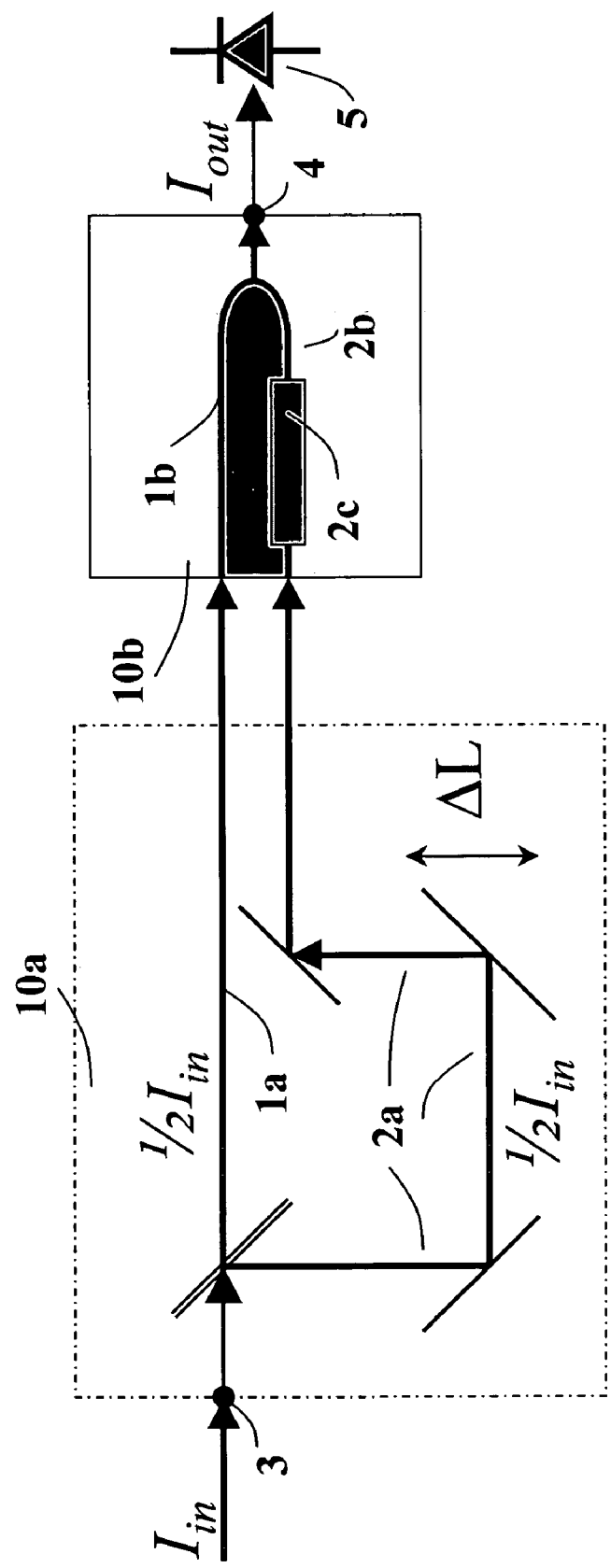
FIG. 2a illustrates an alternative embodiment to that of FIG. 1 providing a continuously a variable time delay incremented within a cascade of a fine precision stage and a course precision stage.

FIG. 2a illustrates an embodiment for providing a continuously variable time delay $\Delta t$ incremented within a cascade of two stages; a fine precision stage 10a and a course precision stage 10b. The fine precision stage 10a employs one half of a free space Mach Zehnder interferometer with a first arm 1a of fixed-length and a second arm 2a of variable length, to provide time delay in fine and fast increments. The course precision stage 10b employs an opposite half of an integrated Mach Zehnder interferometer on a microchip with a first arm 2a and a second arm 2b having a delay element 2c for providing time delay in course and slower increments. Other than in the different way of providing the time delay $\Delta t$, the remaining construction and functionality of this embodiment are similar to those for the preferred embodiment described above and illustrated in FIG. 1. Other elements of this embodiment are omitted for simplicity from FIG. 2 such as the input port 3, the output port 4, the optical sensor 5 and the processor 6.

The embodiment illustrated in FIG. 2a offers the advantages of (a) making use of the amplitude of the oscillatory component of the interference signal rather its phase, considering that $P_0$ and PDP enter into the phase, not the amplitude of the oscillatory component. Furthermore, the coherence lengths of both added noise and original signal are longer than several wavelengths of the detected signal $I_{in}$. Furthermore, this embodiment takes advantage of a fine precision phase delay element in combination with a long travel stage with less setting precision requirement so long it is stable, and this offers a more cost effective solution than the embodiment illustrated in FIG. 1.

Figure 2B:
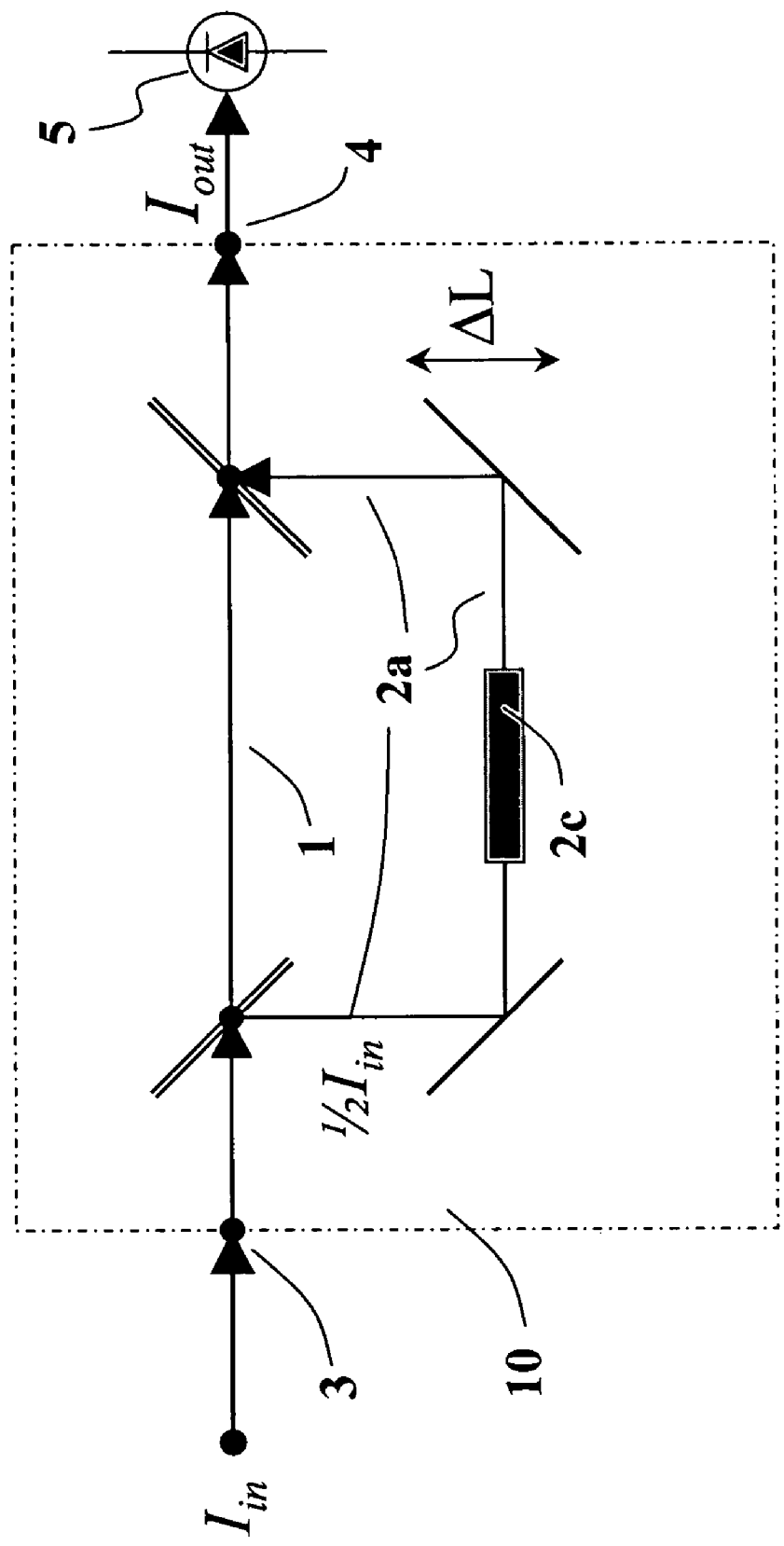
FIG. 2b illustrates another alternative embodiment to that of FIG. 1, which uses a two-beam interferometer 10 incorporating a delay element that allows for the optical paths to be fine tuned over several wavelengths of interest.

As an alternative to incorporating half of a Mach Zehnder interferometer in the embodiment illustrated in FIG. 2a, another embodiment is illustrated in FIG. 2b, which uses a two-beam interferometer 10 similar to that illustrated in FIG. 1a, except for the incorporation of delay element 2c that allows for the optical paths to be fine tuned over several wavelengths of interest. The delay element 2c is optionally made with an electro-optical material suitable for providing fine time delay increments. Alternatively, it is made with thermal optical material to achieve the same purpose.

Figure 3:
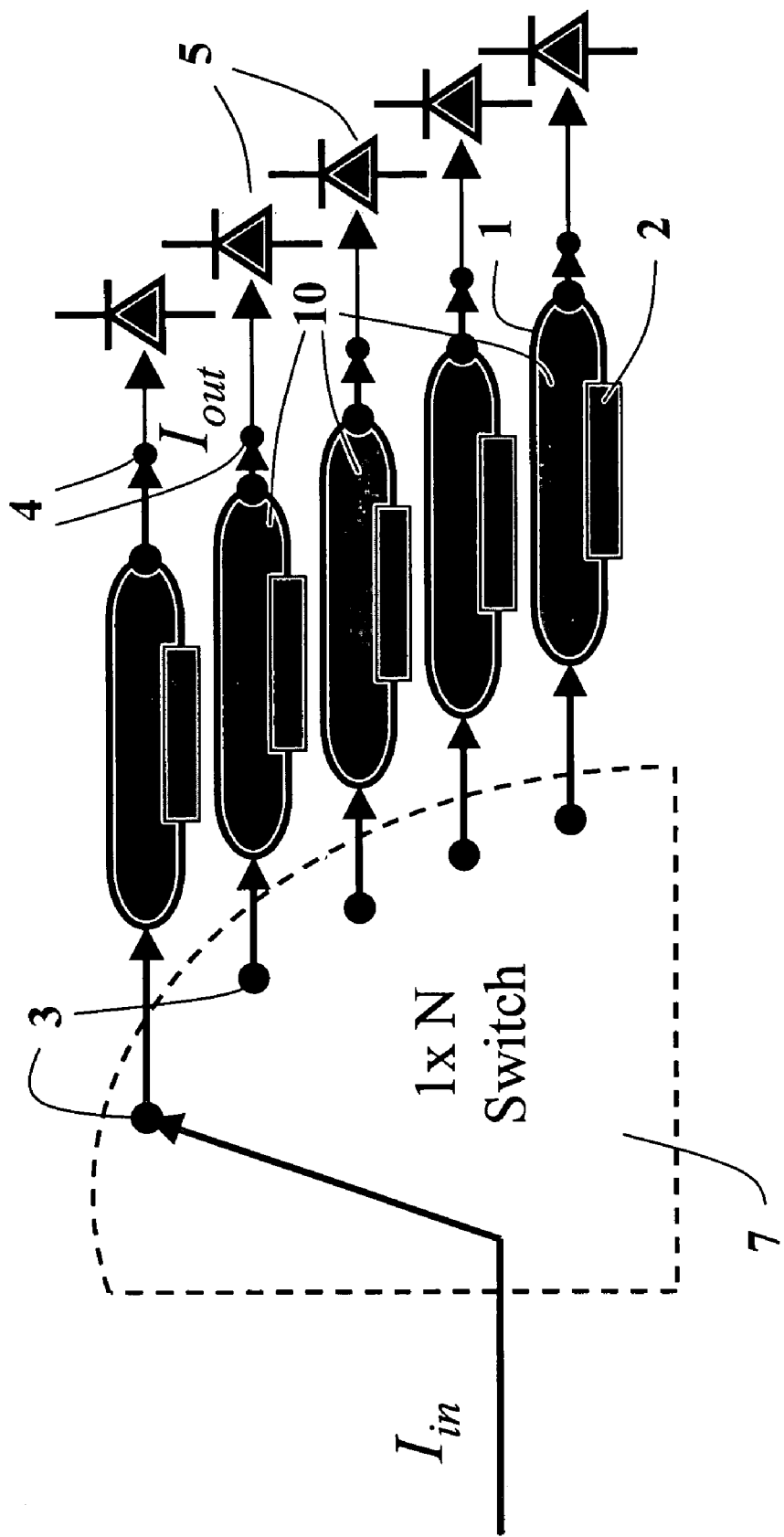
FIG. 3 illustrates yet another embodiment providing a variable time delay with fixed increments by utilizing a 1×N switch.

FIG. 3 illustrates yet another embodiment providing a variable time delay $\Delta t$ with fixed increments for discrete profile detection of the interference amplitude, by utilizing a 1×N switch 7 for directing the detected signal $I_{in}$ into one of N integrated Mach Zehnder interferometers 10, each having an input port 3 diverging into a fixed first arm 1 and a second arm 2 providing a variable stepped time delay within a range different from the other interferometers. The two arms 1 and 2 then converge into an output port 4. Each interferometer 10 operates in a similar fashion to that described for the preferred embodiment described above and illustrated in FIG. 1. Optionally this embodiment is constructed for one of the following features:

The second arm 2 is polarization dependent to monitor the speed variation in communication system polarization.

The second arm 2 is polarization independent.

The diamond diagram is used to extract only the minimum and maximum values of the interference, so that the waveguide birefringence will not come into the evaluation results so long as the sweeping speed of the second arm 2 exceeds the polarization variation speed in the communication system.

Figure 4:
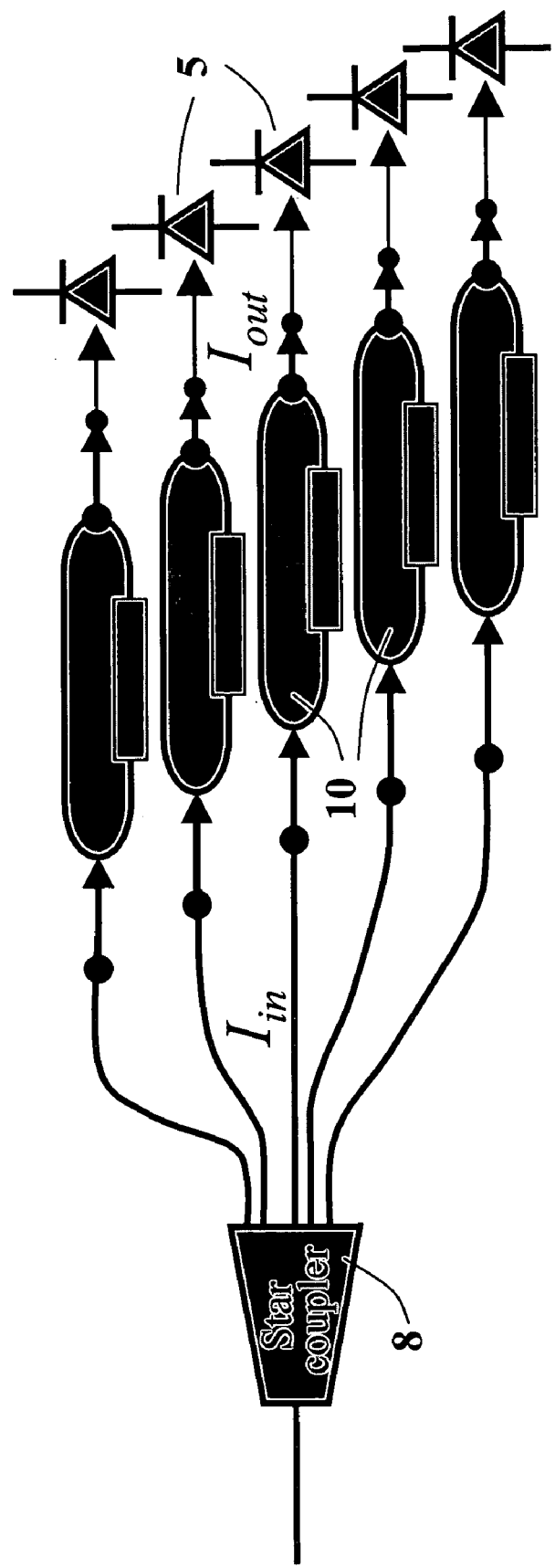
FIG. 4 illustrates an alternative embodiment to that illustrated in FIG. 3, using a star coupler instead of the 1×N switch.
Figure 5:
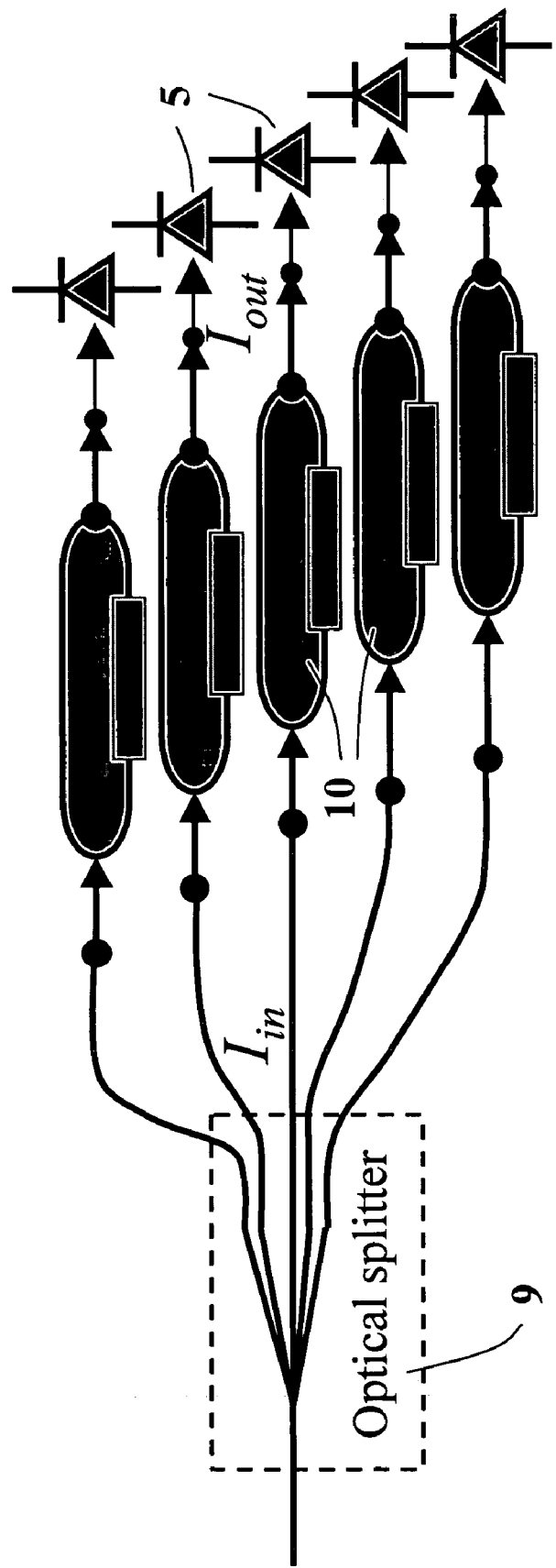
FIG. 5 illustrates an alternative embodiment to that illustrated in FIG. 4, using a signal splitter instead of the star coupler.

Alternatively, a star coupler 8 as shown in FIG. 4 is used instead of the 1×N switch 7 shown in FIG. 3. The star coupler 8 splits an optical signal into N equal portions $I_{in}$ for simultaneous distribution into N interferometers 10. Yet another alternative is to use an optical signal splitter 9 as shown on FIG. 5 instead of the star coupler 8 shown in FIG. 4 to achieve a similar function.

The following theory and discussion in conjunction with referenced figures describe and illustrate how various embodiments of the present invention make use of the interference signal $I_{out}$ to determine the parameters of the detected signal $I_{in}$ indicated in the above description.

Figure 6B:
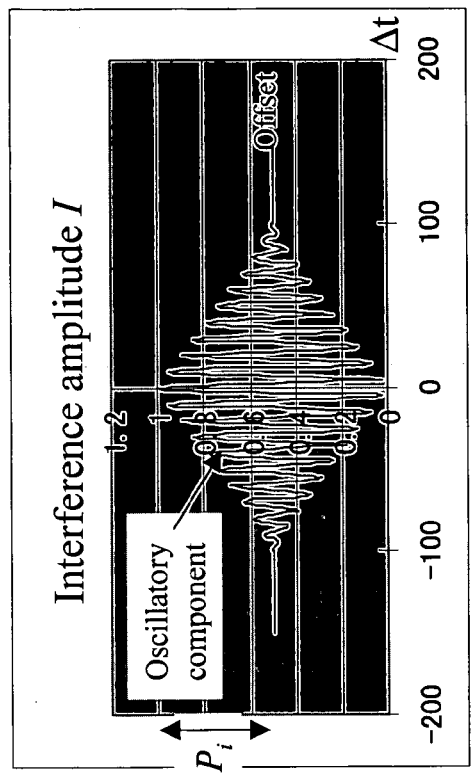
FIG. 6b illustrates in a chart the offset component and the oscillatory component of the interference amplitude of FIG. 6a, as a function of the time delay of the delayed signal portion.
Figure 6A:
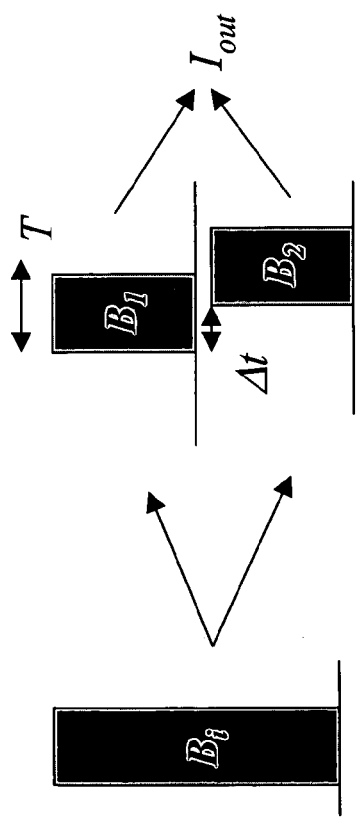
FIG. 6a shows in a timing diagram a single signal bit being split into two portions, with one portion delayed and then recombined with the other portion to produce interference signal, in accordance with the process illustrated in FIG. 1.

The phenomenon of two-beam interference in the absence of any added noise is illustrated in FIGS. 6a and 6b. FIG. 6a shows in a timing diagram a single bit $B_i$ from the detected signal $I_{in}$ being split into first and second bit portions $B_1$ and $B_2$, the second bit portion $B_2$ delayed by the variable time delay $\Delta t$ relative to $B_1$, and then both bit portions are recombined to obtain an interference signal $I_{out}$, in accordance with the process illustrated in FIG 1. When the interference amplitude I of the interference signal $I_{out}$ is mapped as a function of the time delay $\Delta t$, this function I is defined by the following mathematical notation.

$$I = \int dt \left| \frac{1}{2} E(t) \cdot \exp\{i(\omega t)\} + \frac{1}{2} E(t + \Delta t) \cdot \exp\{i(\omega (t + \Delta t))\} \right|^2$$

where $E(t)=1$ for $0<t<T$ while assuming a unit bit intensity. Therefore $$I = \frac{1}{2} + \frac{1}{2} \cos(\omega \Delta t)(T - |\Delta t|)/T$$

In other words, the interference amplitude I will have the following two components, as illustrated in FIG. 6b.
i) Offset component=½
ii) Oscillatory component=½ $\cos(\omega \Delta t)$ $(T-|\Delta t|)/T$
where $(T-|\Delta t|)/T$ represents the convolutional amplitude profile of the oscillatory component within the detected signal coherence length.

Figure 7:
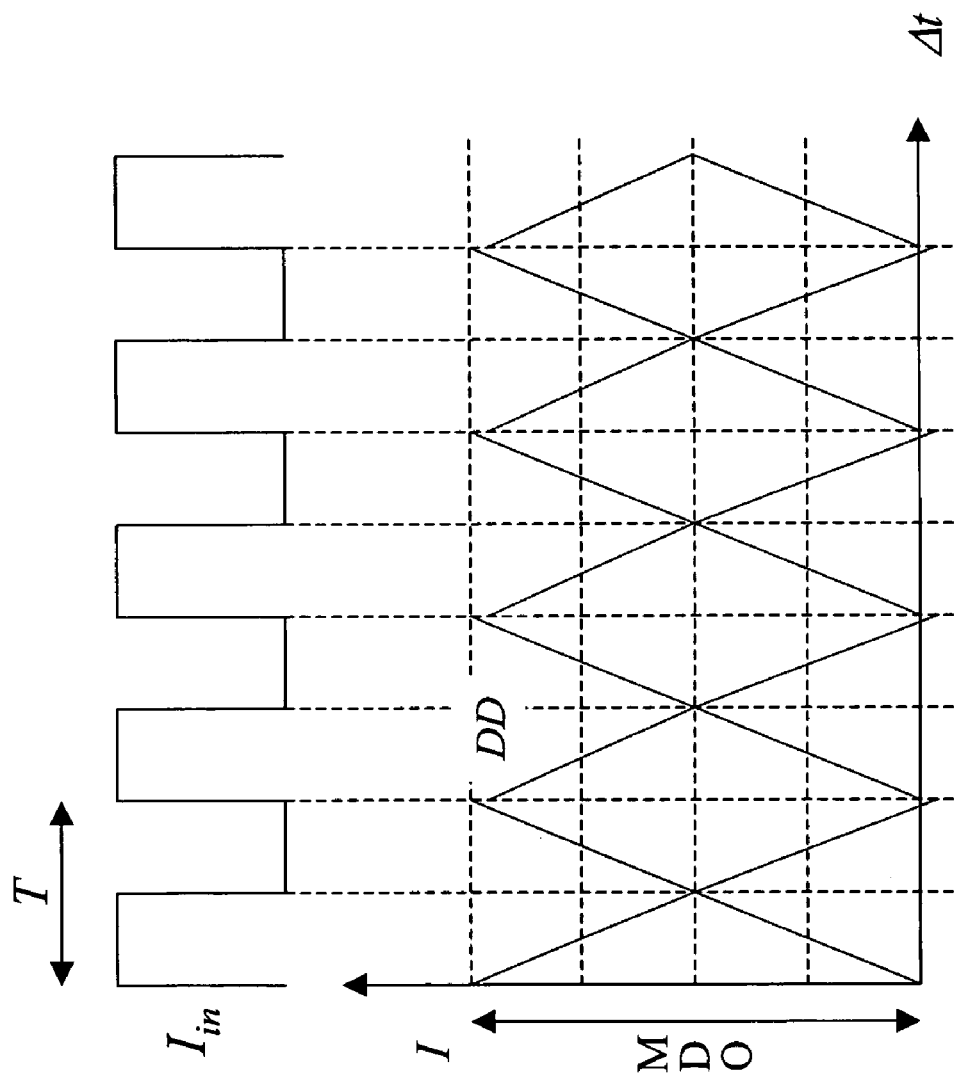
FIG. 7 illustrates in a chart the convolutional amplitude profile of the oscillatory component of the interference amplitude shown in FIG. 6b for a noise-free return-to-zero stream of all one-bits.

FIG. 7 illustrates in a chart the convolutional amplitude profile of the oscillatory component of the interference amplitude I shown in FIG. 6b as a function of the time delay $\Delta t$ for a noise-free return-to-zero detected signal $I_{in}$ carrying a stream of all one-bits. The convolutional profile produces an amplitude profile in the form of an envelope having the shape of a diamond, hence called the diamond diagram (DD), consisting of successive diamonds where each diamond has a maximum diamond opening (MDO) coinciding with $\Delta t$ equal to 0 and each successive multiple of T. The MDO represents the performance clearance between a zero-bit and a one-bit in the detected signal $I_{in}$, and is equal to twice the peak value $P_i$ seen in FIG. 6b. In this respect, successive amplitude profile peak values $P_i$ of the amplitude profile are obtained, such that a first peak value $P_1$ and a first MDO correspond to $\Delta t=0$, a second peak value $P_2$ and a second MDO correspond to $\Delta t=T$. and any subsequent peak value $P_i$ corresponds to $\Delta t=(i-1)T$. Such successive amplitude profile peak values are used in various embodiments of the present invention to determine at least one of a predefined set of parameters related to the detected signal, including among others signal degradation, optical chromatic dispersion, signal coherence length, type of signal modulation, and signal-to-noise ratio, as further described below.

When the embodiment illustrated in FIG. 2 is implemented, the coarse increments allow for slowly determining the location of the amplitude profile peak values, valleys and cross-over points within the DD to determine the successive diamond opening values, whereas the fine increments allow for rapidly measuring the levels of the oscillatory component of the interference amplitude I within the DD.

Alternatively, the "I-versus-$\Delta t$" function is used to obtain the value of the maximum diamond opening MDO for $\Delta t=1$ and using such value to estimate the performance clearance between a zero-bit and a one-bit in the detected signal $I_{in}$. Furthermore, for return-to-zero (RZ) signals, the resulting DD shares a similar meaning with the eye diagram conventionally used in evaluating the bit error rate.

The discussion below now describes how each of various signal parameters mentioned above is estimated by using the interference amplitude profile in accordance with various embodiments of this invention.

i) Signal Degradation

Any deterioration in the detected signal quality in a communication system due to such factors as noise, crosstalk, chromatic dispersion, improper signal filtering, higher order non-linear frequency dependent intensity loss, etc., will cause a deviation in the DD away from that corresponding to the originally transmitted signal. Such a deviation is then used to determine signal degradation.

Figure 8:
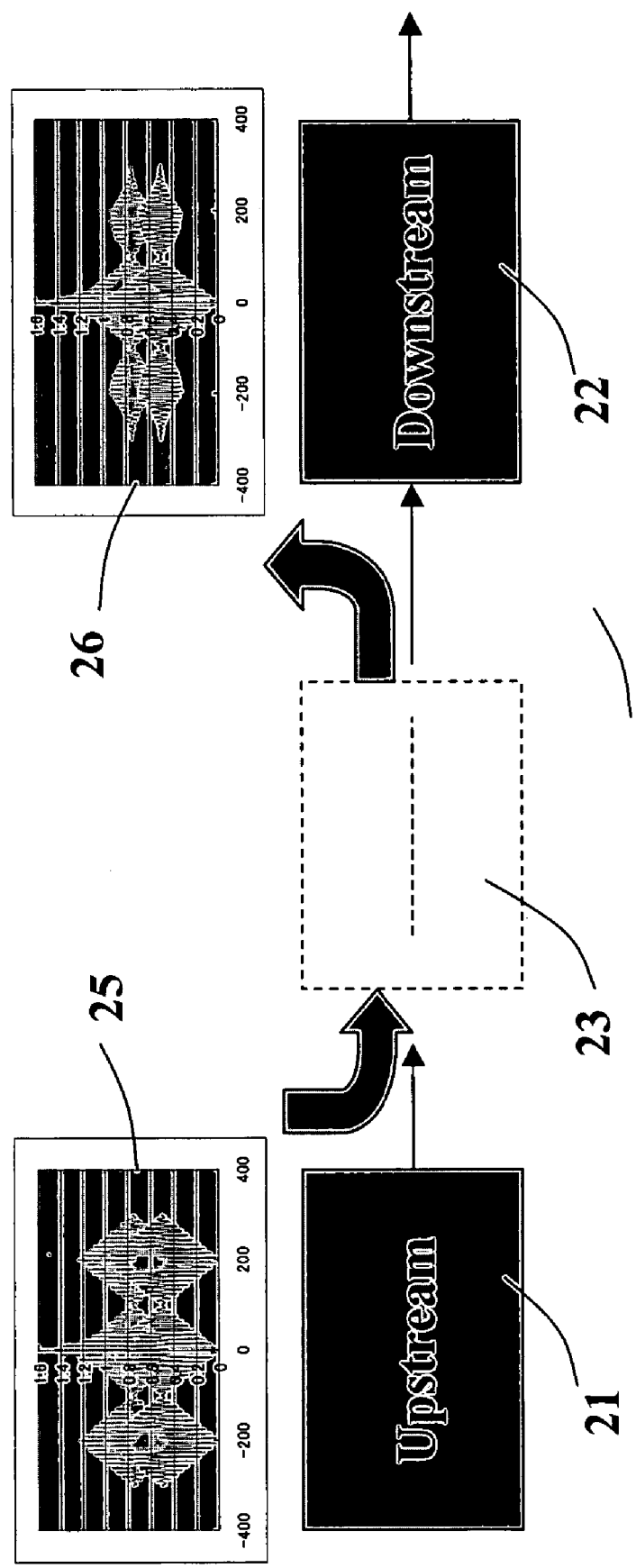
FIG. 8 illustrates an embodiment of the present invention for monitoring communication system performance in terms of signal degradation between an upstream section and a downstream section.

FIG. 8 illustrates an embodiment of the present invention for monitoring communication system performance in terms of signal degradation. In this figure, the communication system is shown to include an upstream section 21, a downstream section 22 and a communication path 23 linking the two sections. At the upstream section 21 the amplitude profile 25 for an upstream optical signal is obtained in accordance with the principles given above in conjunction with the process illustrated in FIG. 1, and is recorded and loaded into the communication path 23 to be transferred to the downstream section 22 and read out there. When the optical signal is received at the downstream section 22, its amplitude profile 26 is also obtained for comparison with the amplitude profile 25 of the upstream signal, to evaluate the degree and type of signal degradation.

ii) Signal Coherence Length and Chromatic Dispersion

The MDO values at successive multiples of the bit duration T are shown in FIG. 7 to be equal to one another for a noise-free return-to-zero detected signal $I_{in}$ carrying a stream of all one-bits. This remains true as long as the cumulative time delay Δt is well below the coherence length of the detected signal $I_{in}$. However as the variable time delay Δt approaches the signal coherence length, the amplitude profile peak value $P_i$ reduces in value as is seen from the following mathematics.

The modulated signal is expressed by $$\vec{E}_s(t) = \vec{E}_o \cdot \exp\left[-\frac{(t-t_o)^2}{\tau^2}\right] \cdot \cos(\omega t + \varphi_o) \cdot F(t)$$

where F(t) is the signal modulation, and τ is the coherence lifetime of the detected signal, which is typically much longer than the bit duration T.

For a better usage of the ITU permitted pass-band window, τ has to be much longer than the F(t) modulation period. Thus, the phases of a substantial amount of successive bits are correlated.

Figure 9:
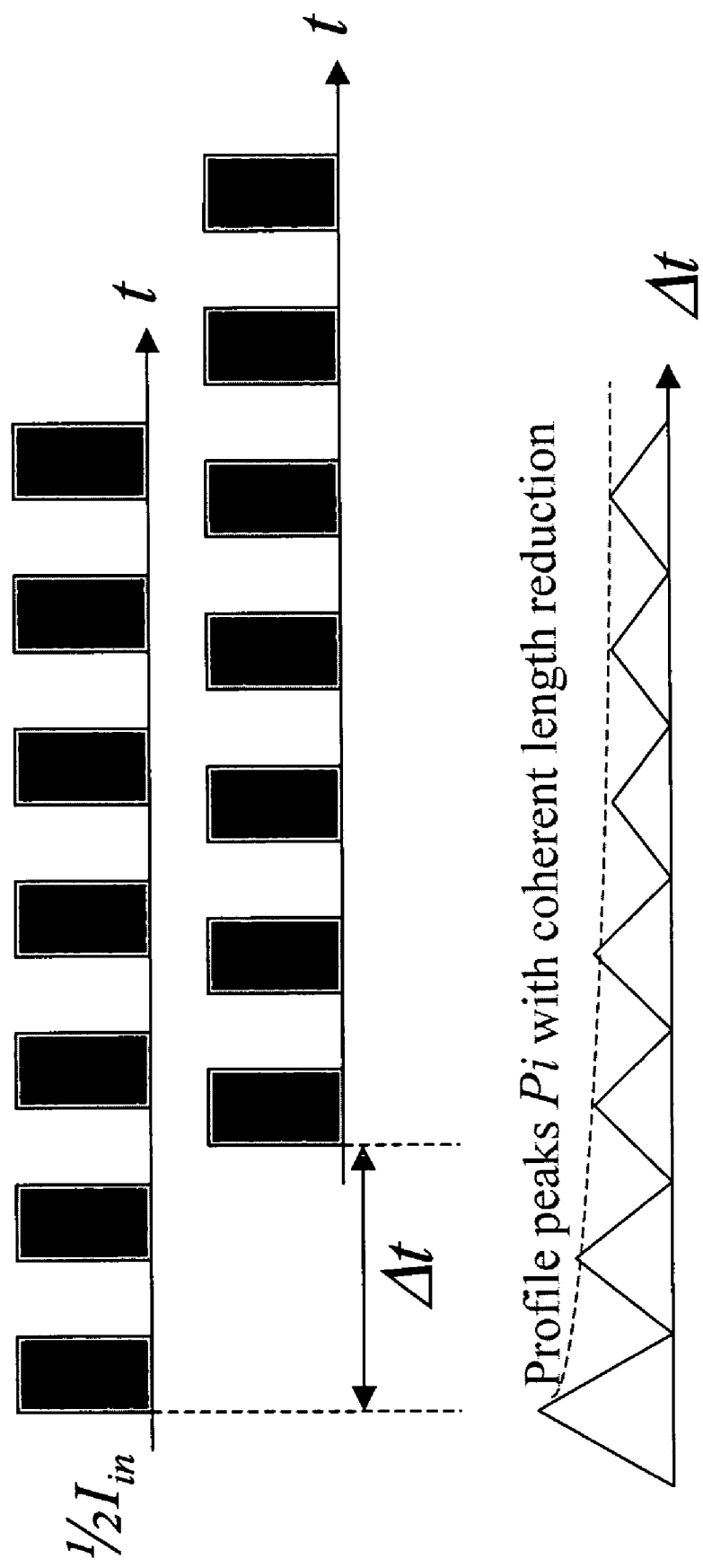
FIG. 9 illustrates, in a timing diagram, decreasing amplitude profile peak values with increasing values of the controllable time delay, for a return-to-zero stream of all one-bits.

The integrated interference amplitude intensity is described by $$I = \int_0^{+\infty} dt \left| \begin{array}{l} \frac{1}{2}\vec{E}_o \exp\left[-\frac{(t-t_o)^2}{\tau^2}\right]\exp[i(\omega t + \varphi_o)]F(t) + \\ \frac{1}{2}\vec{E}_o \exp\left[-\frac{(t+\Delta t-t_o)^2}{\tau^2}\right]\exp[i(\omega t + \Delta t + \varphi_o)]F(t+\Delta t) \end{array} \right|^2$$

and simplified as:

$$I = \frac{1}{2}I_o + \frac{1}{2}\vec{E}_o\vec{E}_o^* \int_0^{+\infty} dt \exp$$

$$\left\{-\frac{\Delta t[2(t-t_o)+\Delta t]}{\tau^2}\right\}\exp\left[-\frac{2(t-t_o)^2}{\tau^2}\right]F(t)F(t+\Delta t)\cos(\omega\Delta t)$$

where $\exp\left\{-\frac{\Delta t[2(t-t_o)+\Delta t]}{\tau^2}\right\}$ describes a decreasing peak value $P_i$ of the interference amplitude profile with increasing value of the variable time delay. This is illustrated in the timing diagram of FIG. 9 for a RZ signal $I_{in}$ carrying a stream of all one-bits.

In accordance with this formulation, the coherence lifetime τ is determined as one of the signal parameters, in an embodiment of the present invention, from the rate of decay in the level of successive peak values with increasing time delays. Any one of the signal coherence length and the chromatic dispersion of a RZ signal is then directly estimated from the coherence lifetime τ, based on well-known principles in the art.

iii) Type of Signal Modulation

Figure 10:
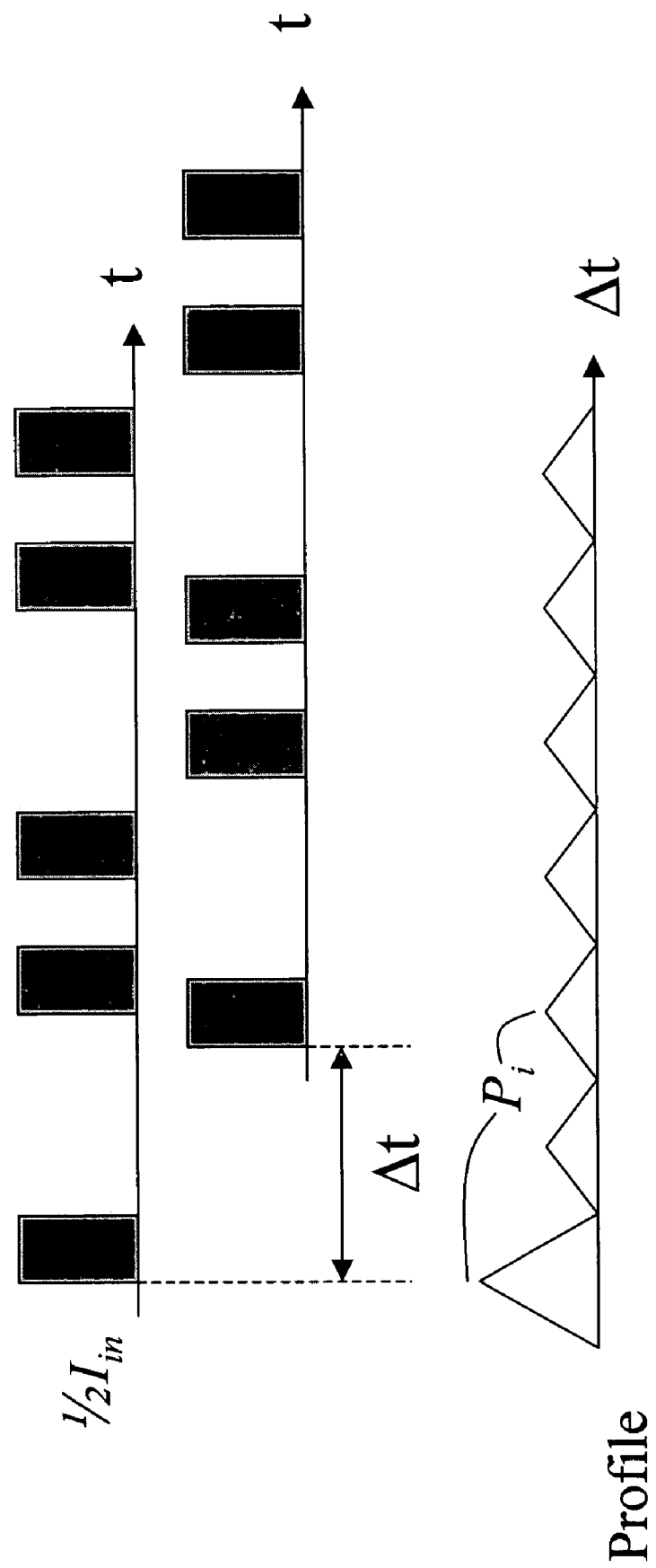
FIG. 10 illustrates in the timing diagram the effect of a noise-free random return-to-zero stream on the amplitude profile peak values obtained by the process illustrated in FIG. 1.

From FIG. 7, it is seen that the successive maximum diamond opening (MDO) are all of equal magnitude when a return-to-zero (RZ) signal $I_{in}$ carries a stream of all one-bits. In an actual communication system, however, the signal carries typically a random stream of one- and zero-bits. The effect of such a random signal without any added noise on the amplitude profile peak values is illustrated in FIG. 10, where the first amplitude profile peak value $P_1$ is twice the second amplitude profile peak value $P_2$. This is in view of the fact that a random signal reduces the interference amplitude peak value to half of that obtained from the coherent interference effect, as the probability of a one-bit being combined with a next one-bit is only 50%.

Figure 11:
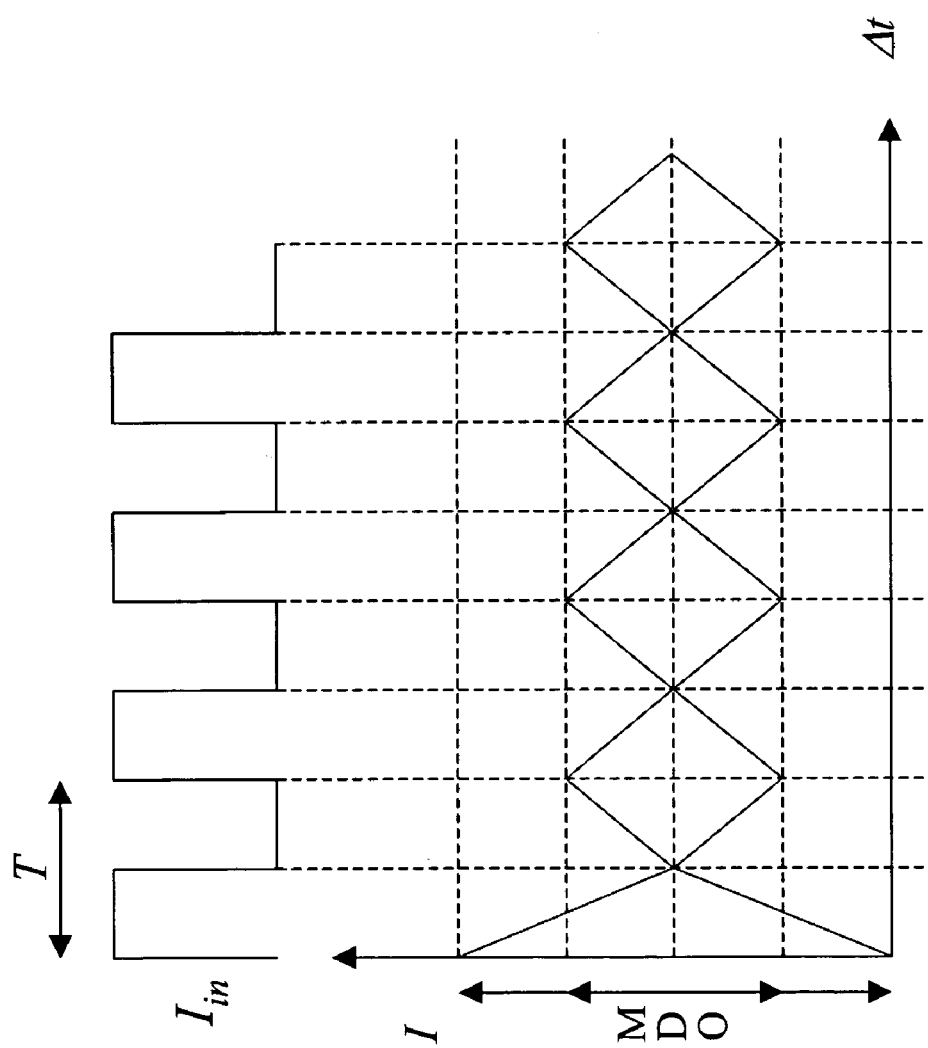
FIG. 11 illustrates the diamond diagram corresponding to a noise-free random stream of return-to-zero signal bits.

The same effect is also illustrated in the diamond diagram (DD) of FIG. 11, which clearly shows the DD having a first MDO at Δt=0, minimum opening at Δt=½T, and successive odd multiples of ½T, a second MDO of half the size as the first MDO at Δt=T, and subsequent MDO's at successive multiples of T, of the same size as the second MDO. The same diamond diagram as that shown in FIG. 11 is also obtained for carrier-suppressed return-to-zero (CSRZ) signals. On this basis, the type of modulation of a random signal is determined by an embodiment of the present invention, as one of the detected signal parameters, to be one of RZ and CSRZ when the DD is found to have successive MDO's at time delays of zero and subsequent multiples of the bit duration, and the second MDO is substantially half the first MDO. It is to be born in mind, however, that with RZ modulation the signal level for a one-bit changes between 1 and 0 over a single bit duration T, whereas with CSRZ modulation the signal level changes between 1 corresponding to a one-bit in a single bit duration T and −1 corresponding to another one-bit in the following single bit-duration T. As a result, the DD profile pattern has a 180° phase in each odd number of T delays.

Figure 12A:
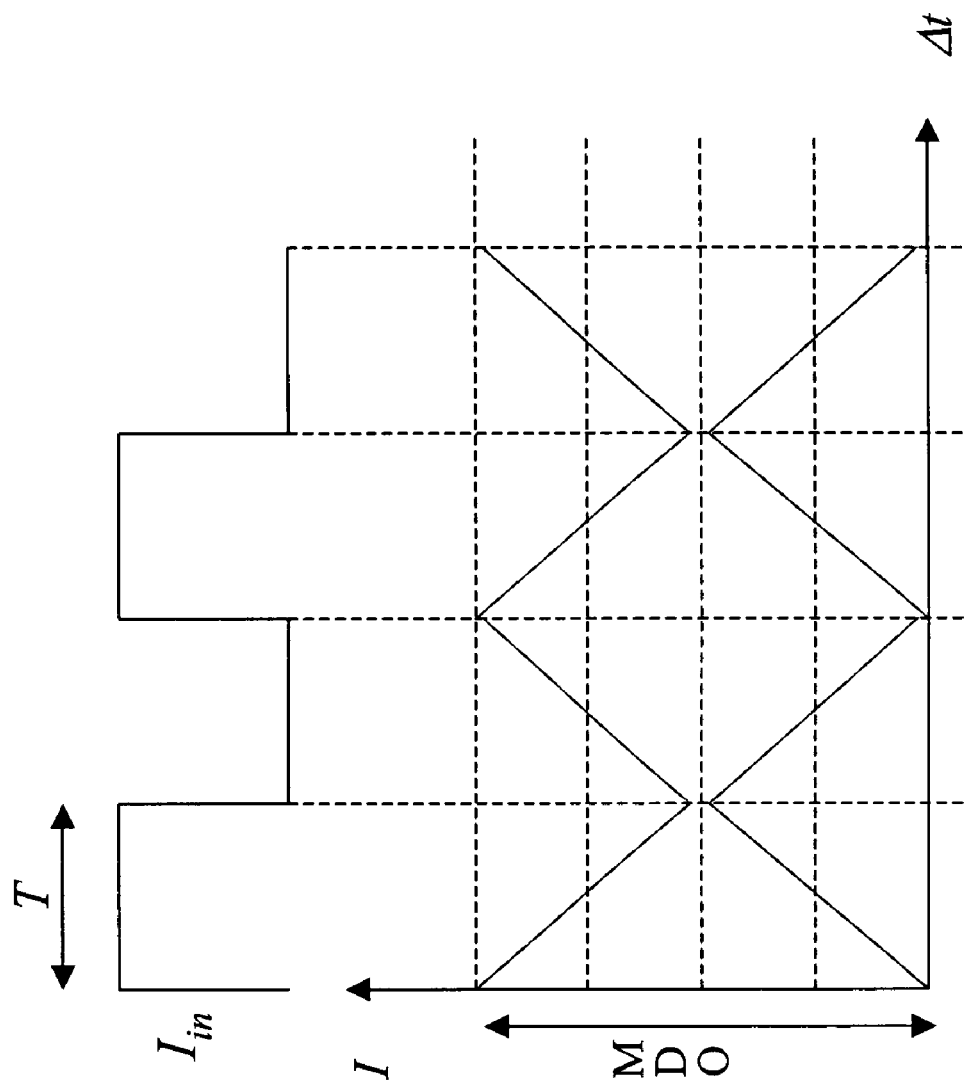
FIGS. 12a illustrates the diamond diagram corresponding to a noise-free non-return-to-zero alternating stream of one- and zero-bits.
Figure 12B:
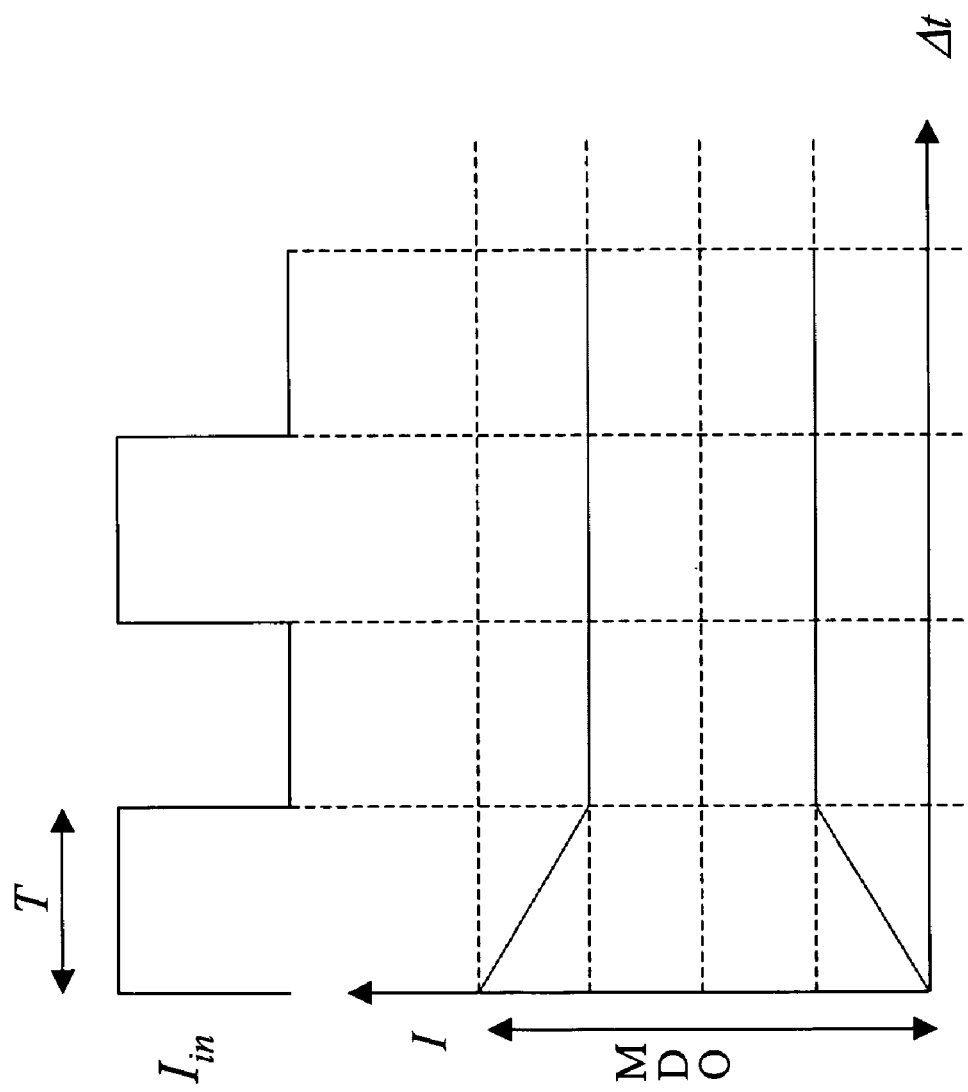
FIGS. 12b illustrates the diamond diagram corresponding to a noise-free random non-return-to-zero stream of signal bits.

In the case of non-return-to-zero (NRZ) signals, the corresponding DD's are illustrated in FIGS. 12a and 12b for two streams of signals. FIG. 12a illustrates the DD for an alternating NRZ stream of one- and zero-bits 10 . . . 10, whereas FIG. 12b illustrates the DD for a random NRZ stream. In FIG. 12a, successive MDO's of equal sizes are obtained at Δt=0, 2T and subsequent even multiples of T, whereas successive minimum openings are obtained at Δt=T, and subsequent odd multiples of T. In FIG. 12b, only a first MDO is obtained at Δt=0, with the diamond opening declining to half the size of the first MDO at Δt=T and remaining constant thereafter. On this basis, the type of modulation of a random signal is determined by an embodiment of the present invention, as one of the detected signal parameters, to be NRZ when the DD is found to have only one first MDO at a zero time delay, with the diamond opening declining to substantially half the first MDO at a time delay of one bit duration and to remain constant thereafter.

Figure 13A:
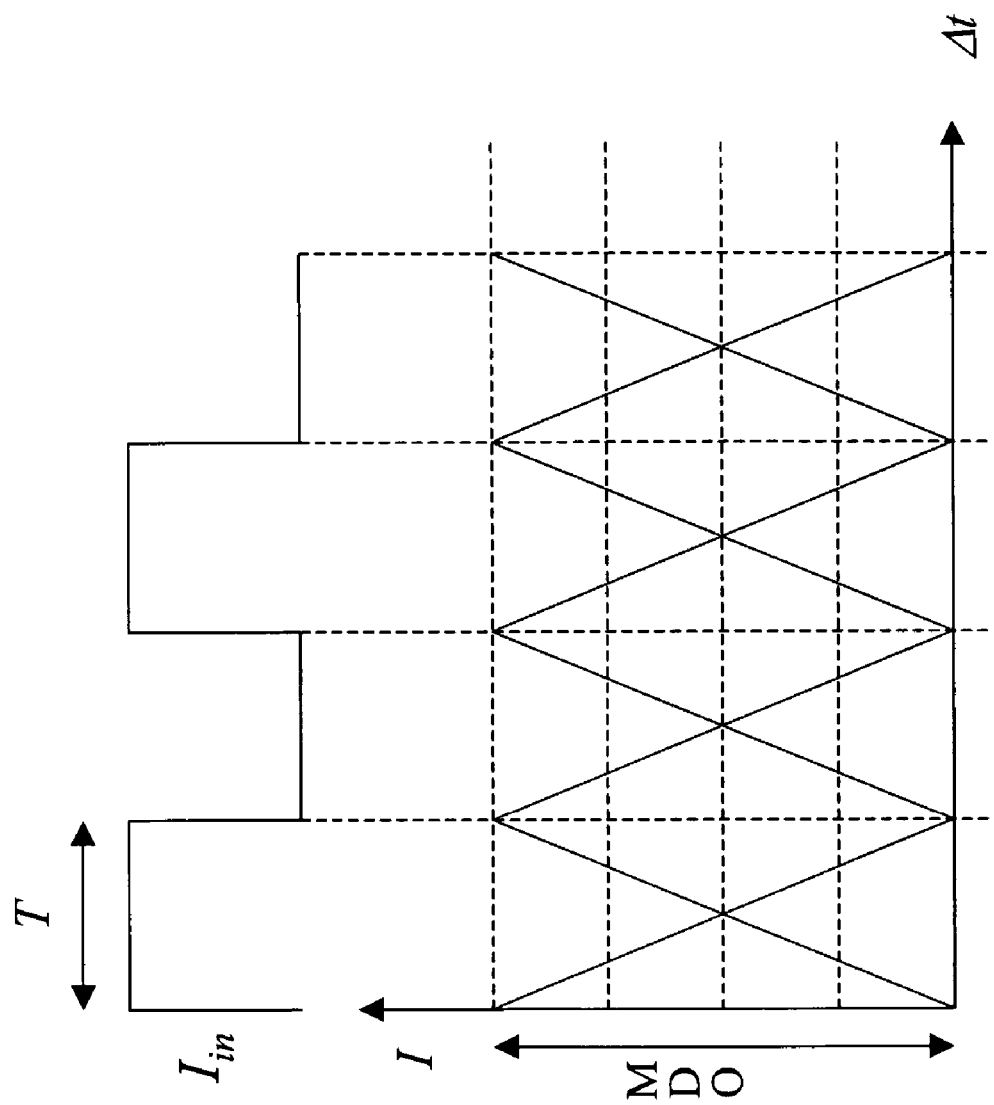
FIGS. 13a illustrates the diamond diagram corresponding to a noise-free phase shift keyed stream of all one-bits.
Figure 13B:
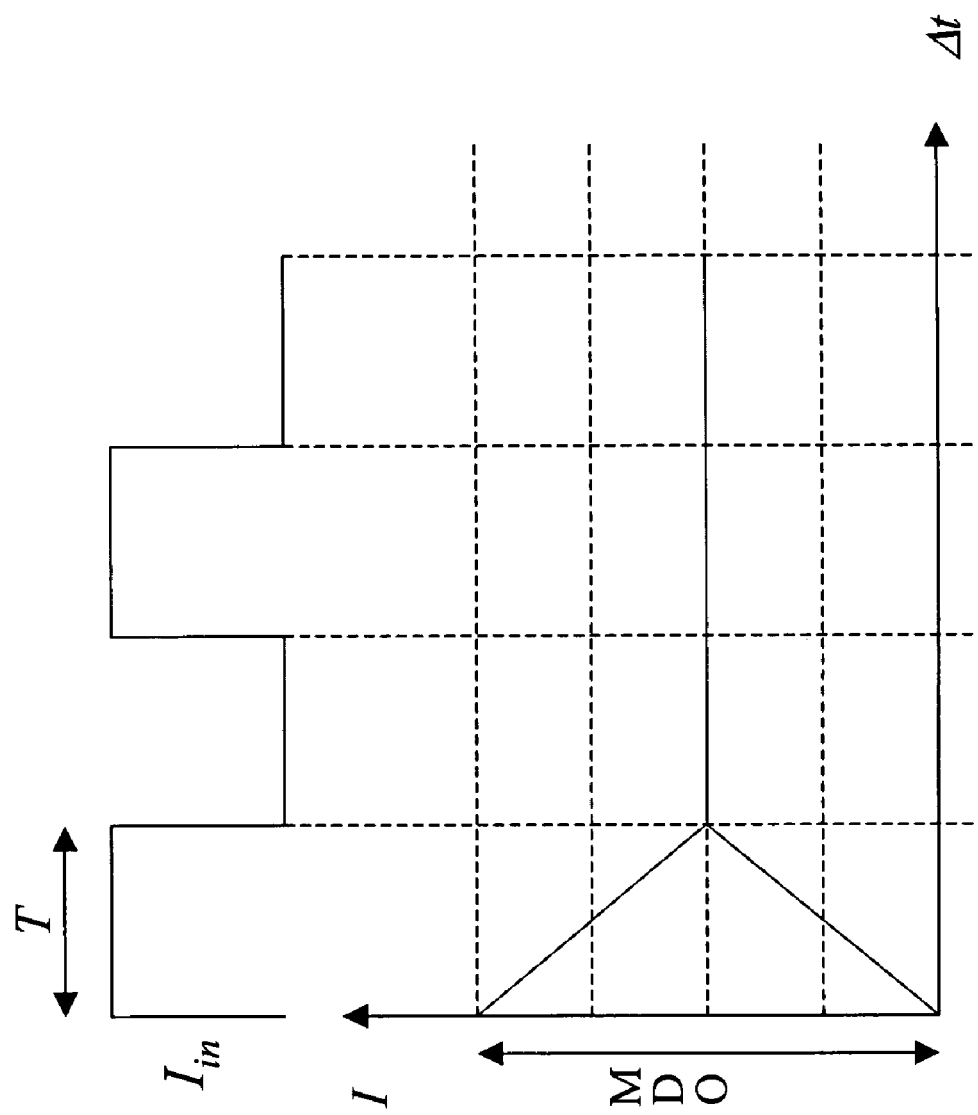
FIG. 13b illustrates the diamond diagram corresponding to a noise-free random stream of phase shift keyed signal bits.

In the case of phase shift keyed (PSK) signals, the corresponding DD's are illustrated in FIGS. 13a and 13b for two streams of signals. FIG. 13a illustrates the DD for a PSK stream of all one-bits, whereas FIG. 13b illustrates the DD for a random PSK stream. In FIG. 13a, successive MDO's of equal sizes are obtained at Δt=0, T and subsequent multiples of T. and minimum openings at Δt=½T, and successive odd multiples of ½T. In FIG. 13b, only a first MDO is obtained at Δt=0, with the diamond opening declining to substantially zero at Δt=T and remaining constant thereafter. On this basis, the type of modulation of a random signal is determined by an embodiment of the present invention as one of the signal parameters to be PSK when the DD is found to have one MDO at a zero time delay, with the diamond opening declining to substantially zero at a time delay of one bit duration and remaining constant thereafter.

iv) Signal-to-noise Ratio

To describe the effect of added noise on a transmitted original signal, noise is generally expressed as:

$$\vec{E}_n(t) = \sum_j \vec{E}_j \cdot \exp\left[-\frac{(t-t_j)^2}{\tau_j}\right] \cdot \cos(\omega_j t + \varphi_j) F_j(t)$$

This includes all emissions j other than the original signal, where $\omega_j$ and $\phi_j$ are the noise frequency and phase respectively, $\tau_j$ is the noise coherence time, and $F_j(t)$ is the noise modulation, which is not applicable in typical circumstances.

The noise coherence time $\tau_j$ is categorized as one of the following:

Having similar coherence time, frequency and phase to the original signal, but with no modulation on $F_j(t)$. This is treated as a signal that is not fully modulated.

Having a shorter coherence time than the original signal, but similar frequency and phase and is modulated as the signal. This is reflected in various embodiments of the present invention as a decrease in the profile peak value of the interference amplitude.

Having a shorter coherence time than the original signal, but similar frequency and phase and is not modulated. This is reflected in various embodiments of the present invention as a decrease of the profile peak and valley value of the interference amplitude.

In all categories, the addition of noise $E_n$ to the original signal $E_s$ yields a mixed (noisy) signal $E_{s,n}$ given by $$|E_{s,n}|^2 = |E_s + E_n|^2$$

Figure 14:
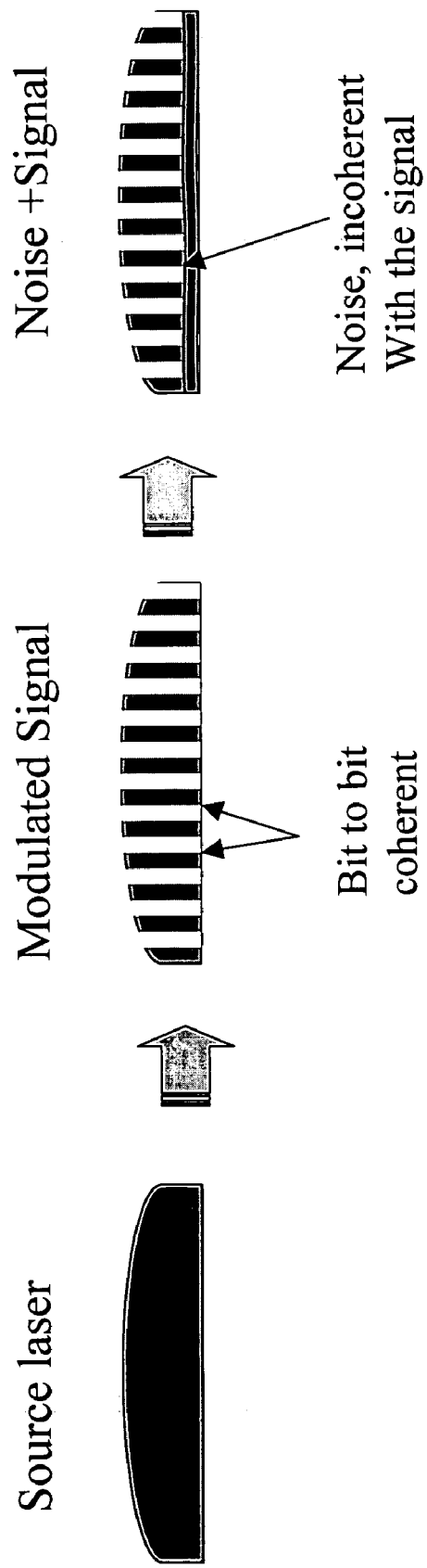
FIG. 14 illustrates the effect of modulation and noise on an original signal, where the added noise is incoherent with the signal.

FIG. 14 illustrates the effect of modulation and noise on an original signal, where the added noise is incoherent with the signal.

The following theory gives the basis for separating the added noise form the original signal in accordance with an embodiment of the present invention.

For a noisy signal $E_{s,n}(t)$ having both the original signal and added noise components, the corresponding detected signal $I_{in}$ in a communication system will be:

$$I_{in} = \int_{t_1}^{t_2} |\vec{E}_{s,n}(t)|^2 dt = \int_{t_1}^{t_2} |\vec{E}_s(t) + \vec{E}_n(t)|^2 dt$$

Therefore $$I_{in} = \int_{t_1}^{t_2} |\vec{E}_s(t)|^2 dt + \int_{t_1}^{t_2} |\vec{E}_n(t)|^2 dt + \underbrace{\int_{t_1}^{t_2} \vec{E}_s^*(t) \cdot \vec{E}_n dt + \int_{t_1}^{t_2} \vec{E}_s(t) \cdot \vec{E}_n^* dt}_{a.\ \text{Correlation Part}}$$

Since the integration of the signal-to-noise correlation is zero, we get.

$$I_{in} = I_s + I_n = \int_{t_1}^{t_2} |\vec{E}_s(t)|^2 dt + \int_{t_1}^{t_2} |\vec{E}_s(t)|^2 dt$$

where $I_s$ and $I_n$ are the original signal and added noise components of the detected signal $I_{in}$ respectively.

On the other hand, we have 100% signal correlation, such that if we split the detected signal $I_{in}$ into two halves as follows:

$$I_{in} = \int_{t_1}^{t_2} |\vec{E}_s(t)|^2 dt = \int_{t_1}^{t_2} \left|\frac{1}{2}\vec{E}_s(t) + \frac{1}{2}\vec{E}_s(t)\right|^2 dt$$

we then get $$I_{in} = \frac{1}{4}\int_{t_1}^{t_2} |\vec{E}_s(t)|^2 dt +$$

$$\frac{1}{4}\int_{t_1}^{t_2} |\vec{E}_s(t)|^2 dt + \underbrace{\frac{1}{4}\int_{t_1}^{t_2} \vec{E}_s^*(t) \cdot \vec{E}_s^* dt + \frac{1}{4}\int_{t_1}^{t_2} \vec{E}_s(t) \cdot \vec{E}_s^* dt}_{\text{Correlation Part}}$$

This will $$give\ I_{in} = \int_{t_1}^{t_2} |\vec{E}_s(t)|^2 dt$$

indicating that a 100% correlation will return to a full signal without noise.

When the detected signal $I_{in}$ corresponding to a noisy signal $E_{s,n}(t)$ is divided into two signal portions with one portion delayed by Δt and then recombined with the other portion in accordance with the present invention, an interference signal $I_{s,n}$ is obtained as follows:

$$I_{s,n} = \int_{t_1}^{t_2} \left| \frac{1}{2}\vec{E}_{s,n}(t) + \frac{1}{2}\vec{E}_{s,n}(t-\Delta t) \right|^2 dt$$

$$= \int_{t_1}^{t_2} \left| \frac{1}{2}\vec{E}_{s,n}(t) \right|^2 dt + \int_{t_1}^{t_2} \left| \frac{1}{2}\vec{E}_{s,n}(t-\Delta t) \right|^2 dt +$$

$$\underbrace{\int_{t_1}^{t_2} \left( \frac{1}{2}\vec{E}_{s,n}^*(t) \cdot \frac{1}{2}\vec{E}_{s,n}(t-\Delta t) \right) dt + \int_{t_1}^{t_2} \left( \frac{1}{2}\vec{E}_{s,n}(t) \cdot \frac{1}{2}\vec{E}_{s,n}^*(t-\Delta t) \right) dt}_{i.\ \text{Correlation part}}$$

This interference effect is a convolution of the two signal portions with one signal portion phase delayed. In case the signal-to-noise convolution is zero, the correlation returns to a signal-only and noise-only correlation.

Typically, the noise coherence length is much shorter than the original signal coherence length is illustrated in the following coherence parameters for the added noise and the original signal.

Noise coherence length is less than 1790 um, and the noise coherence time is 6 ps, when filter window of 200 pm (100 GHz flat top).

Signal coherence length is more than 447620 um, and the signal coherence time is 11493 ps, when using a source laser line width of 0.8 pm (0.1 GHz line width).

The fundamental parameters and optical path differences for reaching the next bit in a modulated optical signal are given in the following table.

| Modulation frequency (GHz) | Modulation period (ps) | Optical path difference for one period (mm) | Wavelength difference for one modulation period (pm) |
|---|---|---|---|
| 1 | 1000 | 299.8 | 7.5 |
| 3 | 333 | 99.9 | 22.5 |
| 10 | 100 | 30.0 | 75.1 |
| 40 | 25 | 7.5 | 300.2 |

In optical communication systems where the present invention is intended for use, signal coherence time corresponds to 3 to 10 GHz modulation. Thus, bit-to-bit phase is correlated for 10 or 40 GHz modulation system. Here, noise coherence time is much shorter than the 40 GHz modulation period, meaning that spectral broadening introduced by the phase interruption will not be smaller than the signal modulation, and the phase interruption will not fill up a major portion of the pass-band window. As a result, noise is not correlated over a single bit-duration, and no interference effect is observed.

Bearing the above discussion in mind, it will now be clear how the signal-to-noise ratio of a detected signal is to be determined in various embodiments of the present invention based on obtaining successive amplitude profile peak values $P_1$ from the coherent interference effect.

Figure 15:
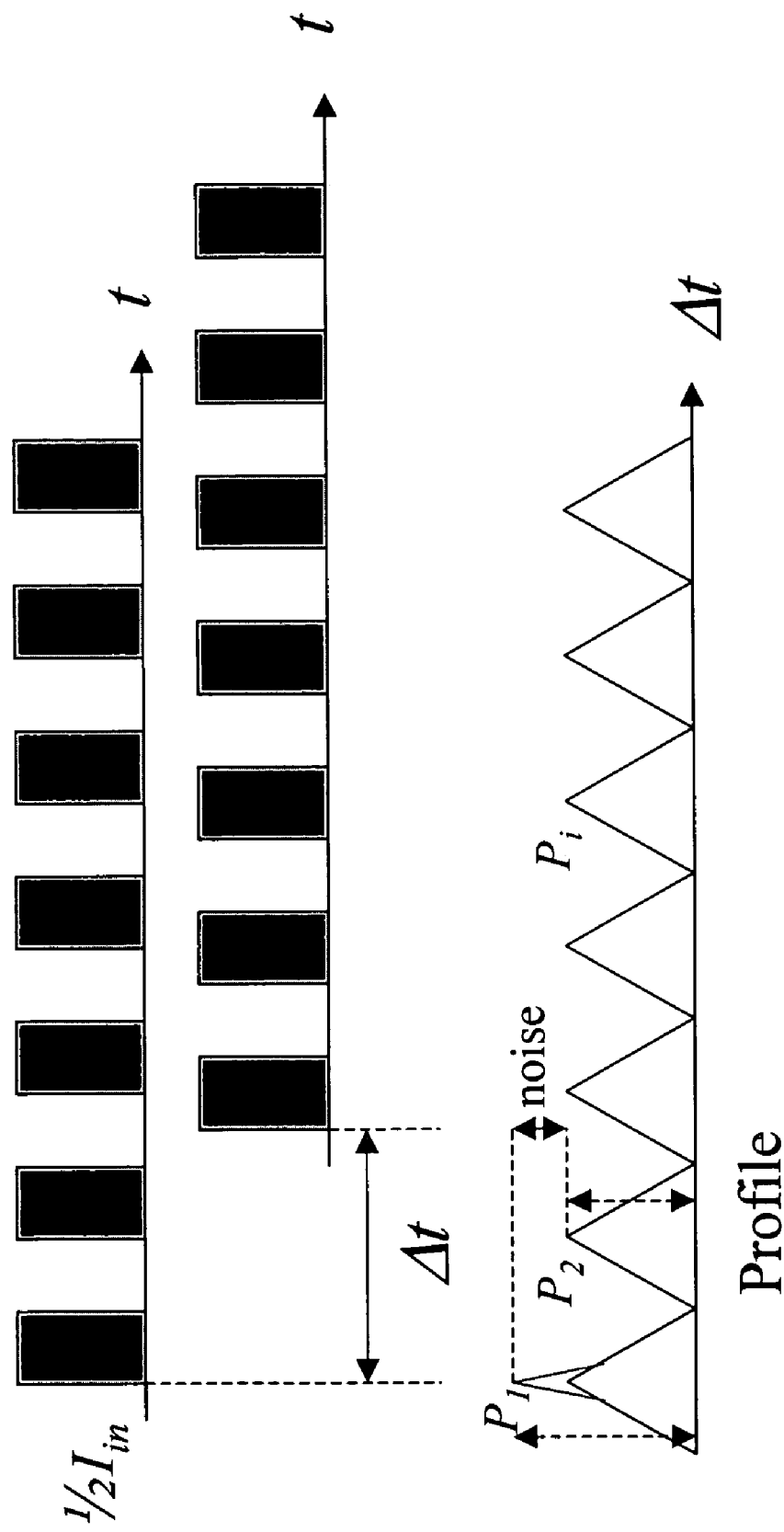
FIG. 15 illustrates in a timing diagram the effect of noise on the amplitude profile peak values obtained from a detected signal carrying a return-to-zero stream of all one-bits.

FIG. 15 illustrates in a timing diagram the effect of noise on the amplitude profile peak values obtained from a detected signal carrying a return-to-zero (RZ) stream of all one-bits. As is evident from FIG. 15, the first amplitude profile peak value $P_1$ corresponds to the added noise and original signal combination, whereas the second amplitude profile peak value $P_2$ corresponds only to the original signal based on the assumption that the original signal has much longer coherence time than the added noise and the original signal coherence length is much longer than that of the added noise in line with the discussion given above.

Figure 16:
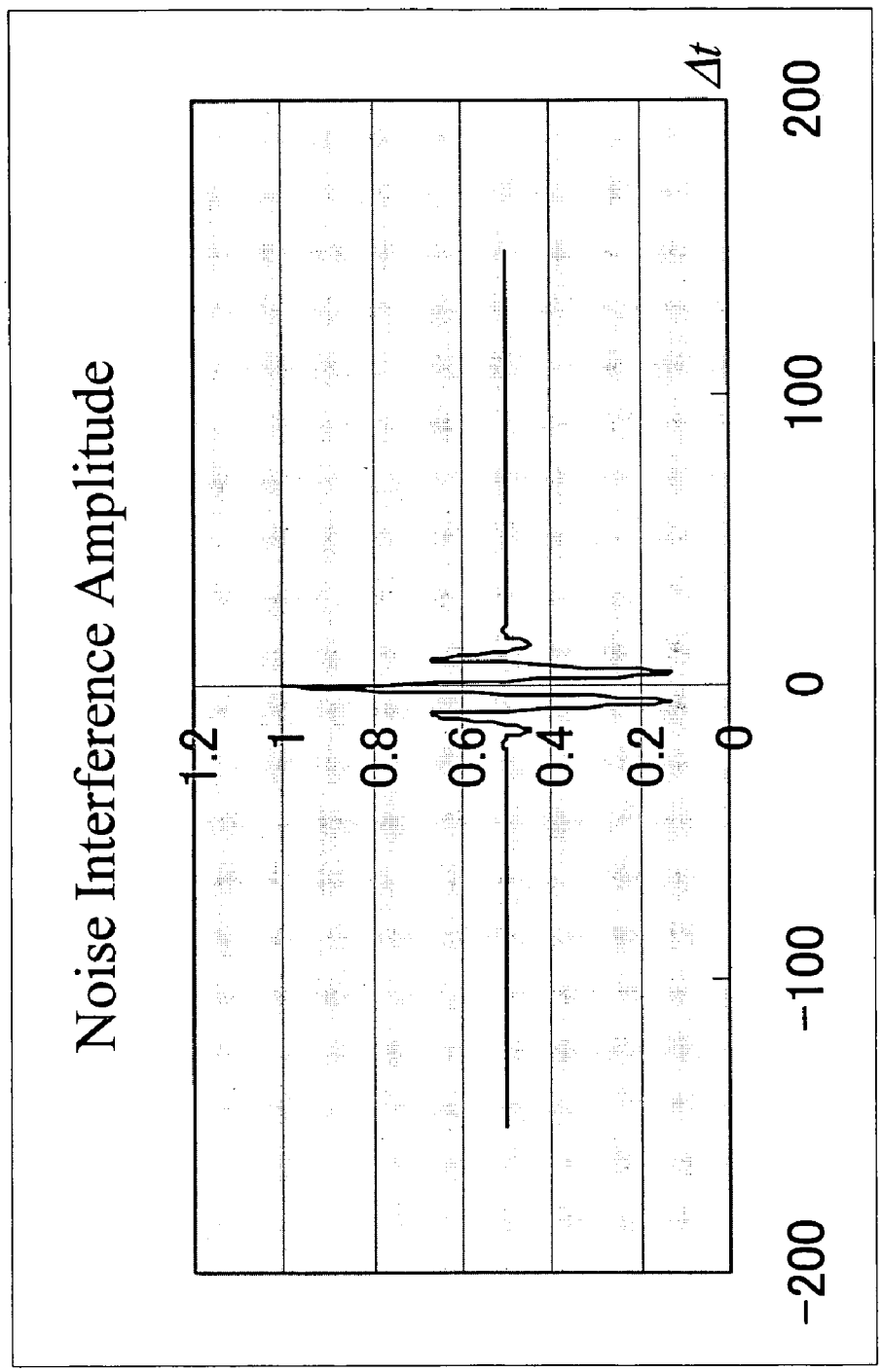
FIG. 16 shows simulated interference amplitude for a single shot of noise with somewhat exaggerated optical frequency.
Figure 17A:
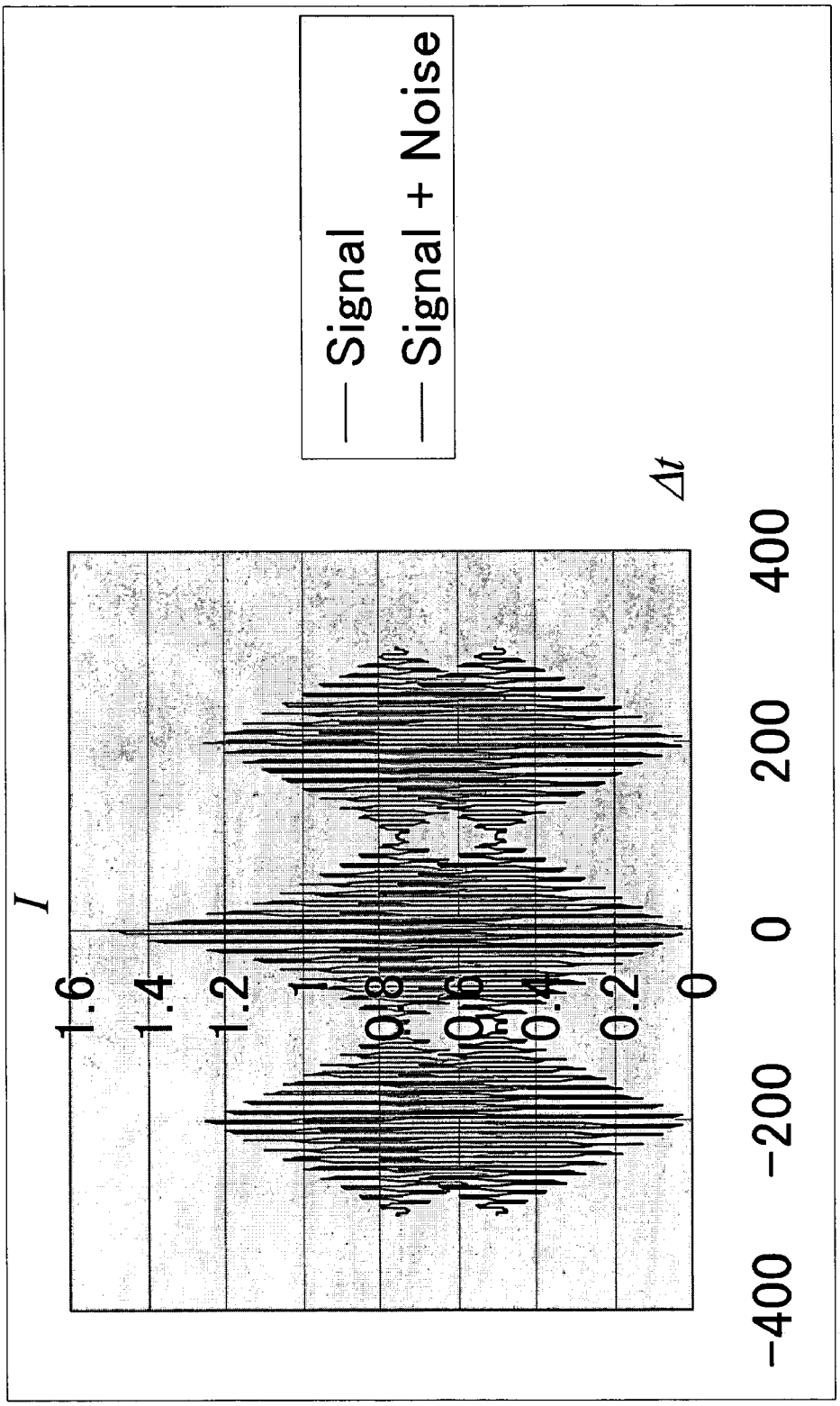
FIG. 17a shows in two overlapping charts, simulated interference amplitudes, for the original signal only and for the original signal plus added noise, respectively for a return-to-zero stream of all one-bits.
Figure 17B:
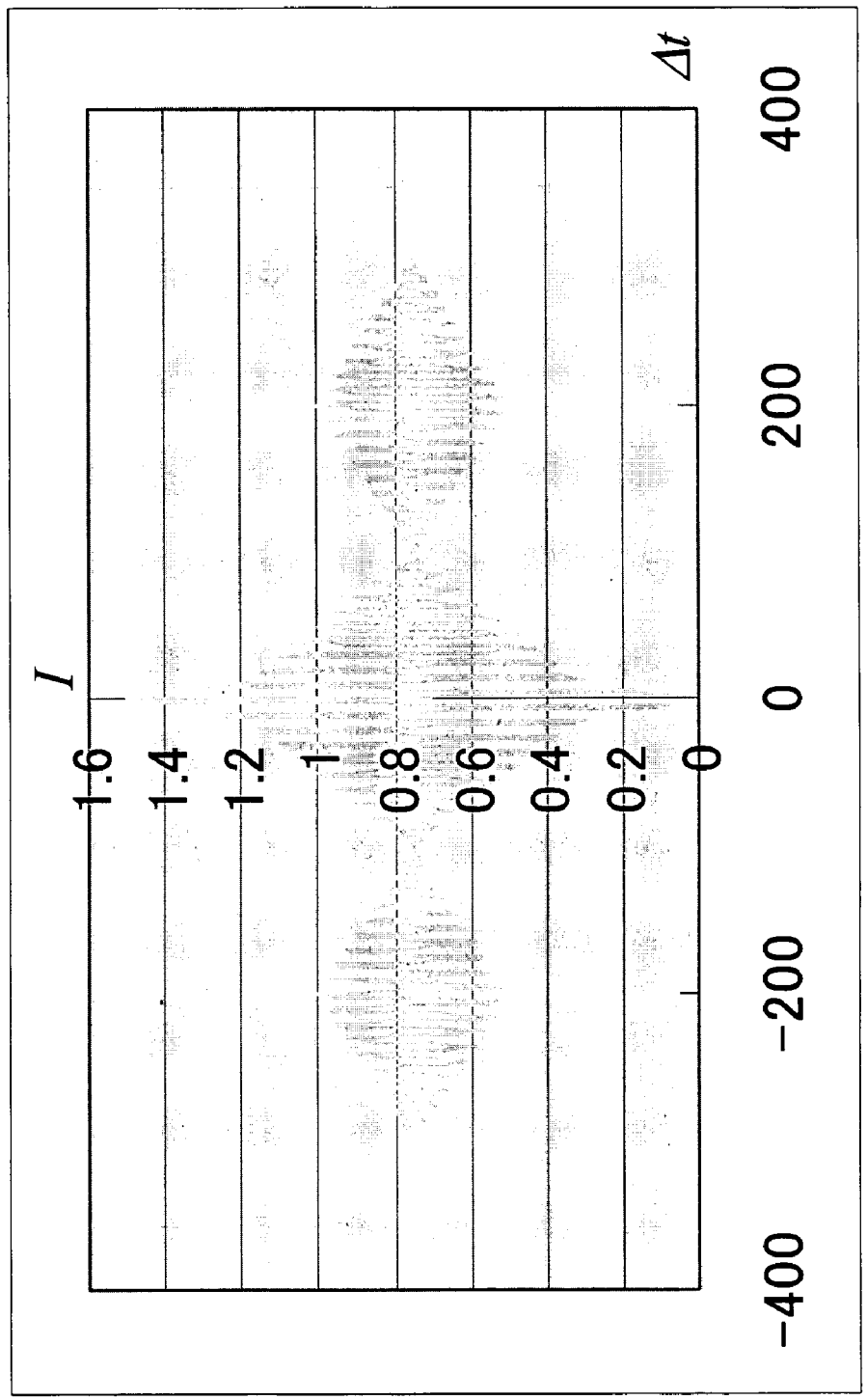
FIG. 17b shows in a single chart the simulated interference amplitude for a random return-to-zero original signal plus added noise.

To obtain an experimental confirmation of such assumptions, a computer simulation of the interference amplitude I as a function of the time delay $\Delta t$ was obtained for the original signal and added noise components of a detected signal. The simulation results are shown in FIGS. 16, 17a and 17b. FIG. 16 shows simulated interference amplitude for a single shot of noise with somewhat exaggerated optical frequency. FIG. 17a shows in two overlapping charts simulated interference amplitudes, for the original signal only and for the original signal plus added noise, respectively for a RZ stream of all one-bits. FIG. 17b shows in a single chart the simulated interference amplitude for a random RZ original signal plus added noise. It is clear from these three figures that the noise affects only the first amplitude profile peak value $P_1$ in view of the width of the noise interference amplitude profile being substantially shorter than one bit duration, as indicated above. It is also clear from FIG. 17a that subsequent peak values $P_i$ are similar to the signal portion of the first amplitude profile peak value $P_1$, in view of the signal being a stream of all one-bits. In contrast, the values of $P_2$ and subsequent peak values in FIG. 17b are half the values of the signal portion of $P_1$, in view of the signal being random with 50% probability that the first and second bits have the same value. This allows an estimation of the added noise level relative to the original signal level, in an embodiment of the present invention, from the values of the first and second amplitude profile peak value $P_1$ and $P_2$. On this basis, the signal-to-noise ratio (SNR) of a detected signal $I_{in}$ carrying a random RZ stream of return-to-zero bits is estimated as one of the signal parameters in an embodiment of this invention by taking the combination of original signal plus added noise as being proportional to the first peak value, and the original signal without noise as being proportional to substantially twice the second peak value, thereby giving an estimate of:

b. $SNR = 2P_2/(P_1 - 2P_2)$

When determining the effect of noise on a detected signal, it is important to take into consideration that noise spectrum is typically broad with short noise lifetime, as is seen form the following.

$$\vec{E}_n(\omega) = \frac{1}{\sqrt{2\pi}} \int dt \sum_i \vec{E}_i \cdot \exp\left[-\frac{(t-t_i)^2}{T_i}\right] \cdot \exp\{i(\omega_i - \omega)t + \varphi_i)\}$$

When noise goes through the channel filters for each ITU grid, the broad spectrum is narrowed, which results in a lengthening of the noise coherence time. This effect is referred to as the uncertainty principle. Thus, system noise feature is determined as one of the signal parameters using an embodiment of the present invention, by selecting a wide filter window. Optionally, no filters are used. Alternatively, channel noise feature is determined using another embodiment of the present invention, by selecting a filter meeting the ITU pass-band requirement.

Figure 18A:
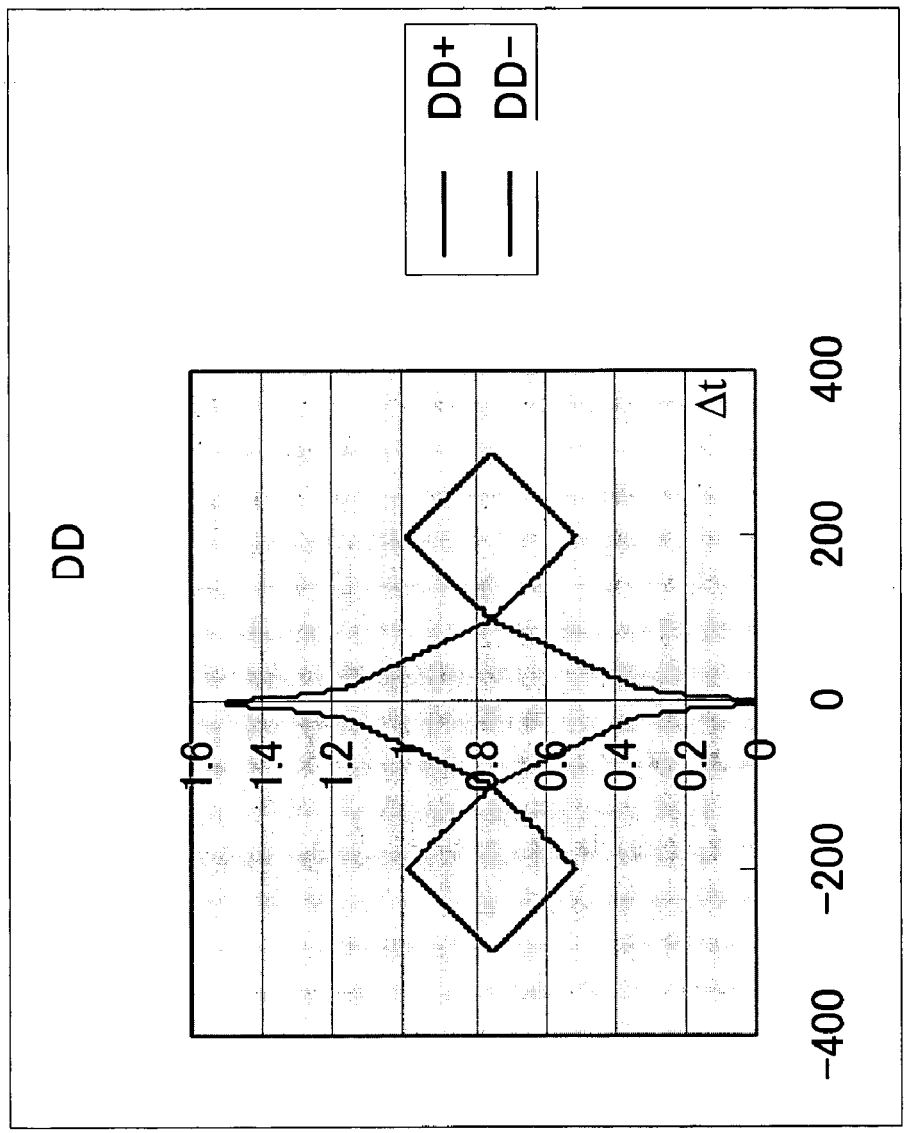
FIG. 18a shows in a chart, simulated diamond diagram obtained by the embodiment illustrated in FIG. 1 providing fine time delay increments, for an optical random return-to-zero original signal plus added noise.

FIG. 18a shows in a chart, simulated interference amplitude profile in the form of a diamond diagram (DD) obtained by the embodiment illustrated in FIG. 1 providing fine time delay increments, for a noisy detected RZ signal carrying a random sequence of one- and zero-bits. It is clear form this chart that the maximum diamond opening (MDO) at the chart centre, corresponding to $\Delta t=0$, is more than twice the MDO to the right, corresponding to $\Delta t=T$. This is consistent with the description given above with respect to a random detected signal, where the difference between the MDO of the central diamond and twice MDO of the right-side diamond.

Figure 18B:
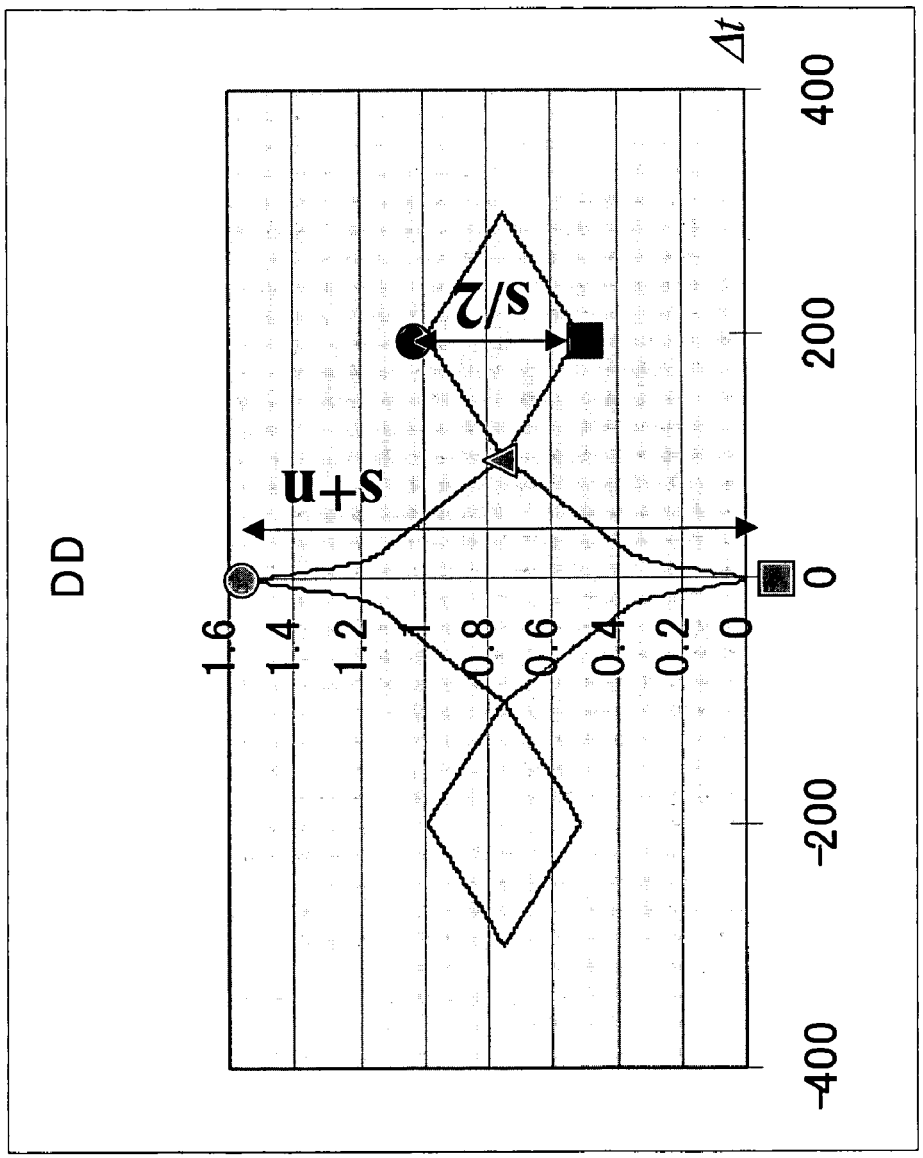
FIG. 18b shows in a chart, simulated diamond diagram obtained by the embodiment illustrated in FIG. 2 providing a cascade of coarse and fine time delay increments, for a noisy random original return-to-zero signal, where the peaks, valleys and cross-over points are marked with circles, squares and triangles respectively.

On the other hand, FIG. 18b shows in a chart simulated interference amplitude profile in the form of a DD obtained by the embodiment illustrated in FIG. 2 providing a cascade of coarse and fine time delay increments, for a noisy detected signal carrying a random sequence of one- and zero-bits, where the peaks, valleys and cross-over points are marked with circles, squares and triangles respectively. The coarse and slower increments thus obtained allow for determining the location of the amplitude profile peaks, valleys and cross-over points within the DD to determine the successive MDO values, whereas the fine and faster increments allow for measuring the levels of the oscillatory component of the interference amplitude I within the DD.

The following table summarizes the capabilities of the present invention in characterizing various signal parameters.

| System Parameters | Measurement capability |
| --- | --- |
| Signal power | Yes, direct |
| Noise power | Yes, direct |
| OSNR | Yes, direct |
| BER | Estimation |
| Q factor | Yes, direct |
| Emission spectrum | No |
| Transient bit profile | Yes, direct |
| Signal coherence length | Yes, direct |
| Noise coherence noise | Yes, direct |

The above-described embodiments are intended to be examples of the present invention. Numerous variations, modifications, and adaptations may be made to the particular embodiments by those of skill in the art, without departing from the spirit and scope of the invention, which are defined solely by the claims appended hereto.

What is claimed is:

1. An apparatus for characterizing a detected signal in a communication system, the apparatus comprising:
   a) at least one interferometer having an input port for receiving the detected signal, the input port diverging into a first aim and a second arm for splitting the detected signal into a first signal portion and a second signal portion between the first and second arms respectively, the second arm having delay means for subjecting the second signal portion to a controllably variable time delay relative to the first signal portion, the first and second arms converging into an output port for recombining the two signal portions to obtain an interference signal;
   b) a processor optically coupled to the output port for using the interference signal in determining at least one of a predefined set of parameters related to the detected signal, by mapping the interference signal as a function of the variable time delay, deriving oscillatory component of said function, and obtaining amplitude profile of the oscillatory component versus the variable time delay.

2. The apparatus of claim 1, wherein the detected signal is an optical signal, the at least one interferometer is a free space Mach Zehnder interferometer.

3. The apparatus of claim 2, wherein the delay means comprises an optical path having a variable optical length.

4. The apparatus of claim 3, wherein the delay means further comprises a phase delay material suitable for providing fine time delay increments.

5. The apparatus of claim 4, wherein the phase delay material is one of electro-optical and thermal optical materials.

6. The apparatus of claim 2, wherein the second arm is polarization dependent to permit monitoring speed variation in the communication system polarization.

7. The apparatus of claim 1, wherein the at least one interferometer is an integrated Mach Zehnder interferometer.

8. The apparatus of claim 1, wherein the detected signal is an optical signal and the at least one interferometer comprises one half free space Mach Zehnder interferometer connected to one half integrated Mach Zehnder interferometer.

9. The apparatus of claim 8, wherein the delay means comprise a variable optical path length in the half free space Mach Zehnder interferometer for providing fine precision time delay increments, and a variable time delay element in the half integrated Mach Zehnder interferometer for providing coarse precision time delay increments.

10. The apparatus of claim 1, wherein the at least one interferometer comprises a plurality of N interferometers, each interferometer providing a time delay range different form all the other N−1 interferometers, the apparatus further comprising distribution means for directing the detected signal into the input port of at least one of the N interferometers.

11. The apparatus of claim 10, wherein the distribution means is a 1×N switch.

12. The apparatus of claim 10, wherein the distribution means is a star coupler.

13. The apparatus of claim 10, wherein the distribution means is a signal splitter.

14. The apparatus of claim 1, wherein the detected signal is an optical signal and the at least one interferometer is a Michelson interferometer.

15. A method for characterizing a detected signal in a communication system, the method comprising the steps of:
   a) deriving two analogous signals from the detected signal;
   b) subjecting one of the two analogous signals to a controllably variable time delay;
   c) recombining the two analogous signals to obtain an interference signal; and
   d) processing the interference signal to determine at least one of a predefined set of parameters related to the detected signal, wherein the processing step comprises mapping the interference signal as a function of the variable time delay, deriving oscillatory component of said function, and obtaining amplitude profile of the oscillatory component versus the variable time delay.

16. A method for monitoring performance of the communication system, by comparing between the amplitude profiles respectively obtained for an upstream signal and a downstream signal in accordance with the method of claim 15.

17. The method of claim 15, wherein the detected signal is a pulsed signal defining a bit duration, and the processing step further comprises determining at least two successive values of the amplitude profile, corresponding to time delay values starting at zero with increments of at least one successive multiple of bit duration, whereby a first amplitude profile value corresponds to zero time delay, and a second amplitude profile value corresponds to a time delay of one bit duration.

18. The method of claim 17, wherein the set of parameters includes signal coherence length estimated from the rate of decay in the at least two successive values of the amplitude profile.

19. The method of claim 17, wherein the detected signal is a combination of an original signal of a longer coherence length than one bit duration, and added noise of a shorter coherence length than one bit duration, and wherein the set of parameters includes signal-to-noise ratio estimated by using the first profile value as an indicator of the combination of the original signal and the added noise, and the second profile value as an indicator of only the original signal.

20. The method of claim 19, wherein the detected signal carries a random return-to-zero stream of bits and the signal-to-noise ratio is estimated by taking the combination of the original signal and the added noise as being proportional to the first amplitude profile value, and the original signal as being proportional to substantially twice the second amplitude profile value.

21. The method of claim 19, wherein the added noise is system noise, and wherein the communication system uses a relatively wide filter window.

22. The method of claim 19, wherein the added noise is channel noise, and wherein the communication system uses a filter meeting the ITU pass-band requirement.

23. The method of claim 15, wherein the detected signal is a pulsed random signal defining a bit duration, the amplitude profile is used to define a diamond diagram, and the set of parameters to be determined includes type of signal modulation.

24. The method of claim 23, wherein the type of signal modulation is determined as one of return-to-zero and carrier-suppressed return-to-zero, when the diamond diagram is found to have an initial maximum diamond opening at zero time delay, and a subsequent maximum diamond opening of substantially half the initial maximum diamond opening at a time delay of one bit duration.

25. The method of claim 23, wherein the type of signal modulation is determined as non-return-to-zero when the diamond diagram is found to have a maximum diamond opening at zero time delay, with the diamond opening declining to substantially half the maximum diamond opening at a time delay of one bit duration and remaining constant thereafter.

26. The method of claim 23, wherein the type of signal modulation is determined as Phase shift keying when the diamond diagram is found to have a maximum diamond opening at a zero time delay, with the diamond opening declining to substantially zero at a time delay of one bit duration and remaining constant thereafter.

27. A method for characterizing a pulsed optical signal, comprising the steps of:
  a) splitting the optical signal into two beams;
  b) applying a controllably variable time delay to one of the two beams;
  c) recombining the two beams to obtain a diamond diagram resulting from the coherent interference effect;
  d) using a maximum opening of the optical diamond diagram to determine performance clearance between a zero-bit and a one-bit of the optical signal.

* * * * *